US008607162B2

(12) United States Patent
Williams et al.

(10) Patent No.: US 8,607,162 B2
(45) Date of Patent: *Dec. 10, 2013

(54) SEARCHING FOR COMMANDS AND OTHER ELEMENTS OF A USER INTERFACE

(75) Inventors: Joshua Matthew Williams, San Jose, CA (US); Tristan Arguello Harris, Santa Rosa, CA (US); Patrick Coffman, Menlo Park, CA (US); Giulia Pereyra Pagallo, Cupertino, CA (US); Christina E. Warren, San Jose, CA (US); Steve Ko, San Francisco, CA (US); Celia Vigil, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 13/154,352

(22) Filed: Jun. 6, 2011

(65) Prior Publication Data
US 2011/0258584 A1    Oct. 20, 2011

Related U.S. Application Data

(63) Continuation of application No. 11/496,006, filed on Jul. 28, 2006, now Pat. No. 7,979,796, which is a continuation-in-part of application No. 10/985,630, filed on Nov. 10, 2004.

(51) Int. Cl.
*G06F 3/048* (2013.01)
*G06F 3/00* (2006.01)

(52) U.S. Cl.
USPC .......................................... 715/823; 715/712

(58) Field of Classification Search
USPC ................................................. 715/823, 712
See application file for complete search history.

(56) References Cited

U.S. PATENT DOCUMENTS

| 5,040,131 A | 8/1991 | Torres |
| 5,485,175 A | 1/1996 | Suzuki |
| 5,806,069 A | 9/1998 | Wakiyama et al. |
| 5,875,446 A | 2/1999 | Brown et al. |

(Continued)

FOREIGN PATENT DOCUMENTS

| EP | 0677803 A2 | 10/1995 |
| EP | 0747804 A1 | 12/1996 |

(Continued)

OTHER PUBLICATIONS

Examiner's Second Report on Australian Patent Application No. AU 2005304334, Oct. 5, 2011, 3 pages.

(Continued)

*Primary Examiner* — Doug Hutton, Jr.
*Assistant Examiner* — Soumya Dasgupta
(74) *Attorney, Agent, or Firm* — Schwegman Lundberg & Woessner, P.A.

(57) ABSTRACT

The present invention provides a search capability to allow a user to easily locate a menu command or other user interface element associated with a search result. In one embodiment, a user enters a search term (or a portion thereof) in a search field. A list of results is displayed, for example in a results menu. The user can select or highlight any of the listed results; in response, the corresponding command is brought into view in context within the user interface, and is highlighted. The user can activate the selected command directly from the search results menu.

35 Claims, 27 Drawing Sheets

(56) References Cited

U.S. PATENT DOCUMENTS

| | | | |
|---|---|---|---|
| 5,982,370 A | 11/1999 | Kamper | |
| 6,012,053 A | 1/2000 | Pant | |
| 6,075,536 A * | 6/2000 | Kunieda et al. | 715/848 |
| 6,112,153 A | 8/2000 | Schaaf et al. | |
| 6,243,093 B1 | 6/2001 | Czerwinski et al. | |
| 6,288,718 B1 | 9/2001 | Laursen et al. | |
| 6,330,576 B1 | 12/2001 | Mochizuki et al. | |
| 6,334,157 B1 | 12/2001 | Oppermann et al. | |
| 6,335,740 B1 | 1/2002 | Tanaka | |
| 6,448,987 B1 | 9/2002 | Easty et al. | |
| 6,453,254 B1 | 9/2002 | Bullwinkel et al. | |
| 6,473,006 B1 | 10/2002 | Yu et al. | |
| 6,654,758 B1 | 11/2003 | Teague | |
| 6,661,425 B1 | 12/2003 | Hiroaki | |
| 6,704,727 B1 * | 3/2004 | Kravets | 1/1 |
| 6,801,230 B2 | 10/2004 | Driskell | |
| 6,839,702 B1 | 1/2005 | Patel et al. | |
| 6,952,675 B1 | 10/2005 | Tahara et al. | |
| 7,028,306 B2 | 4/2006 | Boloker et al. | |
| 7,120,646 B2 * | 10/2006 | Streepy, Jr. | 1/1 |
| 7,194,411 B2 | 3/2007 | Slotznick et al. | |
| 7,249,369 B2 | 7/2007 | Knouse et al. | |
| 7,313,526 B2 * | 12/2007 | Roth et al. | 704/270 |
| 7,340,686 B2 | 3/2008 | Matthews et al. | |
| 7,366,989 B2 * | 4/2008 | Naik et al. | 715/736 |
| 7,448,042 B1 | 11/2008 | Engber et al. | |
| 7,523,187 B1 | 4/2009 | Lavallee et al. | |
| 7,979,796 B2 | 7/2011 | Williams et al. | |
| 8,024,335 B2 | 9/2011 | Anthony et al. | |
| 2001/0030667 A1 | 10/2001 | Kelts | |
| 2002/0002588 A1 | 1/2002 | Sugimoto | |
| 2002/0044152 A1 | 4/2002 | Abbott, III et al. | |
| 2002/0163547 A1 | 11/2002 | Abramson et al. | |
| 2003/0098893 A1 | 5/2003 | Makinen | |
| 2003/0105748 A1 | 6/2003 | Ishida et al. | |
| 2003/0142140 A1 * | 7/2003 | Brown et al. | 345/803 |
| 2003/0236778 A1 | 12/2003 | Masumoto et al. | |
| 2004/0090472 A1 | 5/2004 | Risch et al. | |
| 2004/0133564 A1 | 7/2004 | Gross et al. | |
| 2004/0135815 A1 | 7/2004 | Browne et al. | |
| 2004/0143564 A1 | 7/2004 | Gross et al. | |
| 2004/0143569 A1 | 7/2004 | Gross et al. | |
| 2005/0066270 A1 | 3/2005 | Ali et al. | |
| 2005/0283468 A1 | 12/2005 | Kamvar et al. | |
| 2006/0101347 A1 * | 5/2006 | Runov et al. | 715/764 |
| 2006/0294475 A1 | 12/2006 | Holecek et al. | |
| 2007/0033172 A1 | 2/2007 | Williams et al. | |
| 2007/0156648 A1 * | 7/2007 | Bridges et al. | 707/3 |
| 2007/0218445 A1 | 9/2007 | Uwague-Igharo | |
| 2007/0300177 A1 | 12/2007 | Karas et al. | |
| 2008/0163085 A1 | 7/2008 | Subbu et al. | |

FOREIGN PATENT DOCUMENTS

| | | |
|---|---|---|
| EP | 1045314 A2 | 10/2000 |
| EP | 1363185 A2 | 11/2003 |
| EP | 1447758 A2 | 8/2004 |
| JP | 10-333554 A | 12/1998 |
| JP | 11-126145 A | 5/1999 |
| JP | 2000-216871 A | 8/2000 |
| JP | 2001-117689 A | 4/2001 |
| JP | 2003-122746 A | 4/2003 |
| JP | 2004-030122 A | 1/2004 |
| JP | 2004-062567 A | 2/2004 |
| JP | 2004-302981 A | 10/2004 |
| WO | WO-03/052574 A1 | 6/2003 |

OTHER PUBLICATIONS

Second Office Action for Chinese Patent Application No. CN 200580038476.3, Jun. 21, 2011, 16 pages.

ActiveState, ActiveTcl User Guide, "Incr Tk", ActiveTcl 8.4.1.0, Nov. 6, 2002, 6 Pages.

Microsoft Corporation, Microsoft Active Accessibility', Aug. 2001, 3 pages, [online][retrieved on Dec. 6, 2011] retrieved from the internet <URL:http://msdn.microsoft.com/en-us/library/ms971350(d=printer).aspx>.

Sinclair, R., "Microsoft Active Accessibility: Architecture", Microsoft Corporation, May 2000, 10 pages.

Sinclair, R., "Microsoft Active Accessibility Architecture: Part 2", Microsoft Corporation, Jul. 2000, 10 pages.

Klementiev, D., "Software Driving Software: Active Accessibility-Compliant Apps Give Programmers New Tools to Manipulate Software", MSDN Magazine, Apr. 2000, 11 pages.

Abrams, M., "Device Independent Authoring with UIML", Oct. 2000, W3C Workshop on Web Device Independent Authoring, 6 pages.

U.S. Appl. No. 10/985,630, Advisory Action mailed Oct. 30, 2008, 3 pgs.

U.S. Appl. No. 10/985,630, Appeal Brief filed Mar. 30, 2009, 32 pgs.

U.S. Appl. No. 10/985,630, Appeal Decision mailed Aug. 21, 2012, 8 pgs.

U.S. Appl. No. 10/985,630, Decision on Pre Appeal Brief mailed Jan. 23, 2009, 2 pgs.

U.S. Appl. No. 10/985,630, Examiners Answer to Appeal Brief mailed Sep. 3, 2009, 39 pgs.

U.S. Appl. No. 10/985,630, Examiners Interview Summary mailed Sep. 11, 2012, 2 pgs.

U.S. Appl. No. 10/985,630, Final Office Action mailed Apr. 2, 2008, 34 pgs.

U.S. Appl. No. 10/985,630, Final Office Action mailed Aug. 26, 2008, 34 pgs.

U.S. Appl. No. 10/985,630, Non Final Office Action mailed May 23, 2013, 19 pgs.

U.S. Appl. No. 10/985,630, Non Final Office Action mailed Jul. 25, 2007, 27 pgs.

U.S. Appl. No. 10/985,630, Notice of Allowance mailed Nov. 15, 2012, 8 pgs.

U.S. Appl. No. 10/985,630, Notice of Non-Compliant Amendment mailed Apr. 28, 2009, 2 pgs.

U.S. Appl. No. 10/985,630, Pre Appeal Brief Request filed Dec. 29, 2008, 5 pgs.

U.S. Appl. No. 10/985,630, Preliminary Amendment filed Nov. 18, 2005, 33 pgs.

U.S. Appl. No. 10/985,630, Reply Brief filed Nov. 3, 2009, 10 pgs.

U.S. Appl. No. 10/985,630, Response filed Jun. 16, 2009 to Notice of Non-Compliant Amendment mailed Apr. 28, 2009, 4 pgs.

U.S. Appl. No. 10/985,630, Response filed Jul. 23, 2008 to Final Office Action mailed Apr. 2, 2008, 2 pgs.

U.S. Appl. No. 10/985,630, Response filed Aug. 4, 2008 to Final Office Action mailed Apr. 2, 2008, 24 pgs.

U.S. Appl. No. 10/985,630, Response filed Oct. 19, 2008 to Final Office Action mailed Aug. 26, 2008, 24 pgs.

U.S. Appl. No. 10/985,630, Response filed Dec. 26, 2007 to Non Final Office Action mailed Jul. 25, 2007, 26 pgs.

U.S. Appl. No. 11/496,006, Examiner Interview Summary mailed Oct. 1, 2010, 3 pgs.

U.S. Appl. No. 11/496,006, Examiner Interview Summary mailed Nov. 3, 2010, 3 pgs.

U.S. Appl. No. 11/496,006, Non Final Office Action mailed Ju. 23, 2010, 43 pgs.

U.S. Appl. No. 11/496,006, Notice of Allowance mailed Mar. 4, 2011, 25 pgs.

U.S. Appl. No. 11/496,006, PTO Response to 312 Communication mailed Apr. 4, 2011, 2 pgs.

U.S. Appl. No. 11/496,006, Response filed Feb. 4, 2010 to Restriction Requirement mailed Jan. 4, 2010, 17 pgs.

U.S. Appl. No. 11/496,006, Response filed Mar. 28, 2011 to Notice of Allowance mailed Mar. 4, 2011, 3 pgs.

U.S. Appl. No. 11/496,006, Response filed Nov. 22, 2010 to Non Final Office Action mailed Jun. 23, 2010, 21 pgs.

U.S. Appl. No. 11/496,006, Restriction Requirement mailed Jan. 4, 2010, 5 pgs.

Australian Application Serial No. 2005304334, Examiner's First Report dated Apr. 13, 2010, 3 pgs.

Australian Application Serial No. 2005304334, Response filed Jan. 12, 2012 to Examiner's Second Report dated Oct. 5, 2011, 19 pgs.

(56) References Cited

OTHER PUBLICATIONS

Canadian Application Serial No. 2,584,823, Office Action mailed May 9, 2012, 21 pgs.
Canadian Application Serial No. 2,584,823, Response filed Nov. 9, 2012 to Office Action mailed May 9, 2012, 35 pgs.
Chinese Application Seial No. 200580038476.3, Office Action mailed Sep. 5, 2008, (w/ English Translation), 16 pgs.
Chinese Application Serial No. 200580033476.3, Response filed Mar. 20, 2009 to Office Action mailed Sep. 5, 2008, (w/ English Translation of Amended Claims), 23 pgs.
Chinese Application Serial No. 200580038476.3, Response filed Nov. 7, 2011 to Office Action mailed Jun. 21, 2011, (w/ English Translation of Pending Claims), 29 pgs.
Drag and drop available target indicator, *Research Disclosure*, 341044, (Sep. 1, 1992), 711.
European Application Serial No. 05851583.4, Decision mailed Oct. 15, 2012, 54 pgs.
European Application Serial No. 05851583.4, Minutes of Oral Proceedings mailed Oct. 15, 2012, 21 pgs.
European Application Serial No. 05851583.4, Office Action mailed Aug. 14, 2007, 7 pgs.
European Application Serial No. 05851583.4, Response filed Jan. 13, 2012, 22 pgs.
European Application Serial No. 05851583.4, Response filed Feb. 22, 2008 to Office Action mailed Aug. 14, 2007, 15 pgs.
European Application Serial No. 05851583.4, Response filed Oct. 20, 2009 to Second Examination Report mailed Mar. 16, 2009, 26 pgs.
European Application Serial No. 05851583.4, Second Examination Report mailed Mar. 16, 2009, 5 pgs.
European Application Serial No. 05851583.4, Summons mailed Oct. 25, 2011, 9 pgs.
International Application No. PCT/US2005/041078, International Preliminary Report on Patentability mailed May 15, 2007, 18 pgs.
International Application No. PCT/US2005/041078, International Search Report mailed Aug. 12, 2006, 8 pgs.
International Application No. PCT/US2005/041078, Written Opinion mailed Aug. 12, 2006, 17 pgs.
International Application Serial No. PCT/US2005/041078, Partial International Search Report mailed Jun. 6, 2006, 3 pgs.
Japanese Application Serial No. 2007-540425, Office Action mailed Apr. 1, 2011, (w/ English Summary), 6 pgs.
Japanese Application Serial No. 2007-540425, Office Action mailed Jun. 8, 2012, (w/ English Summary), 2 pgs.
Japanese Application Serial No. 2007-540425, Response filed Oct. 3, 2011 to Office Action mailed Apr. 1, 2011, (w/ English Translation of Amended Claims), 42 pgs.
Japanese Application Serial No. 2007-540425, Response filed Oct. 9, 2012 to Office Action mailed Jun. 8, 2012, (w/ English Translation of Amended Claims), 32 pgs.
Japanese Application Serial No. 2011-219668, Office Action mailed Feb. 22, 2013, (w/ English Summary), 3 pgs.
"Microsoft", Windows XP Operating System, Version 2002, (2008), 3 pgs.
"Snapshots of Windows XP", Microsoft Windows XP, (2001), 4 pgs.
Becker, C. H. et al., "Smart Application Selection Assistant", IBM Technical Disclosure Assistant, (Feb. 1995), 353-355.
Hearst, M. A:, "Chapter 10—User Interfaces and Visualization", *In: Modern Information Retrival*, Baeza-Yates, R., et al., Editors, ACM Press, Addison Wesley Longman Limited, Harlow, Essex, England, (1999), 257-339.

\* cited by examiner

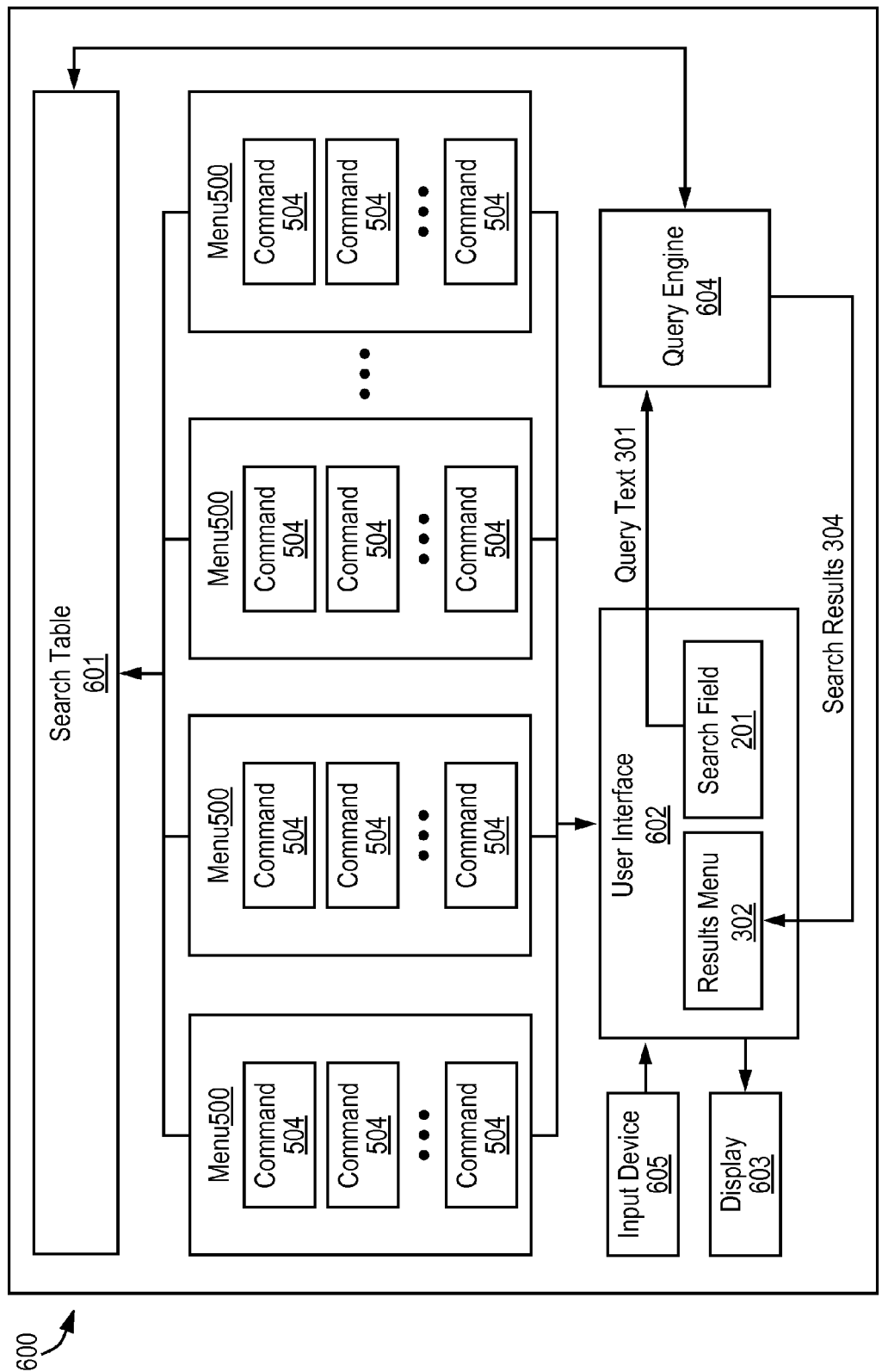

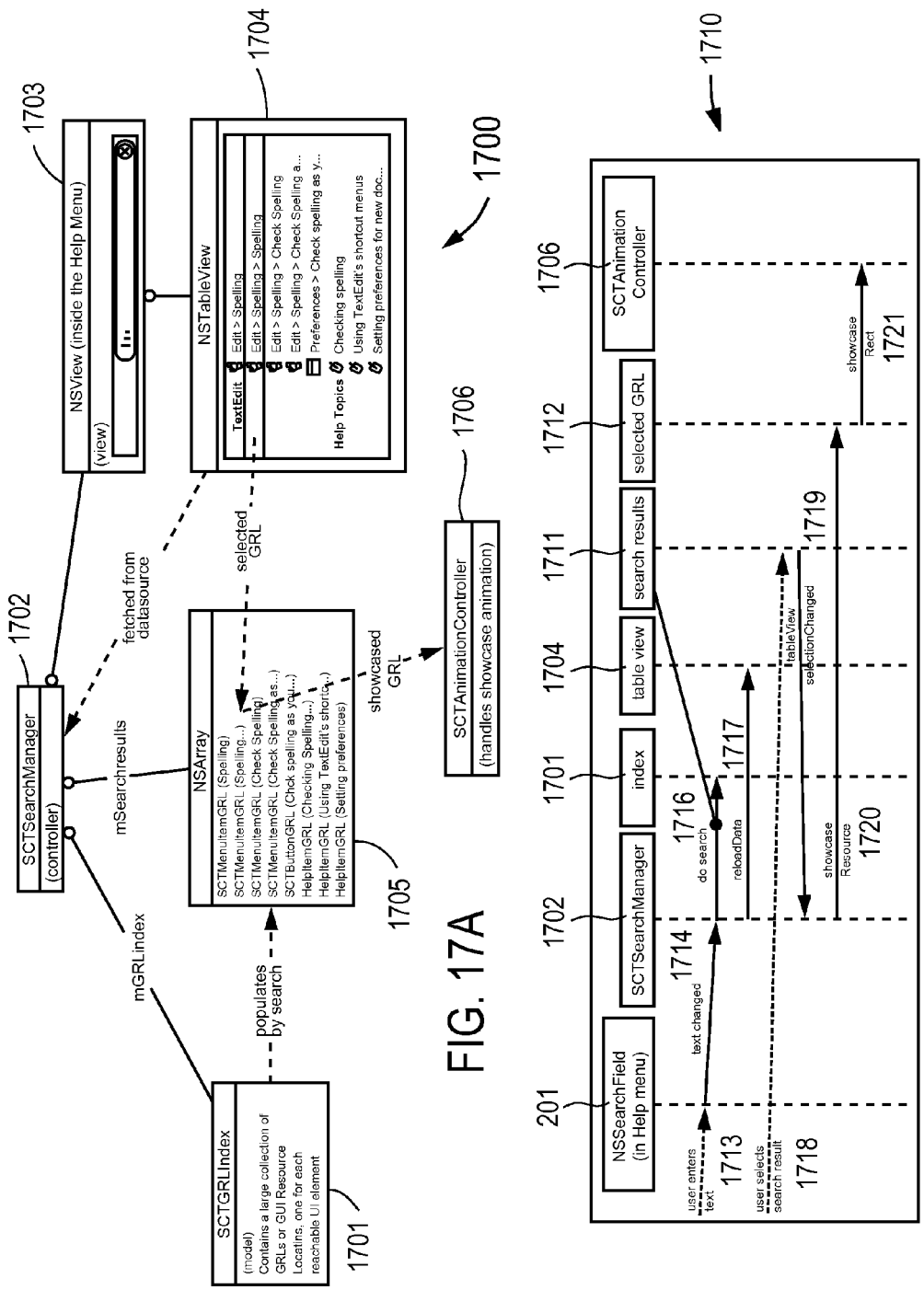

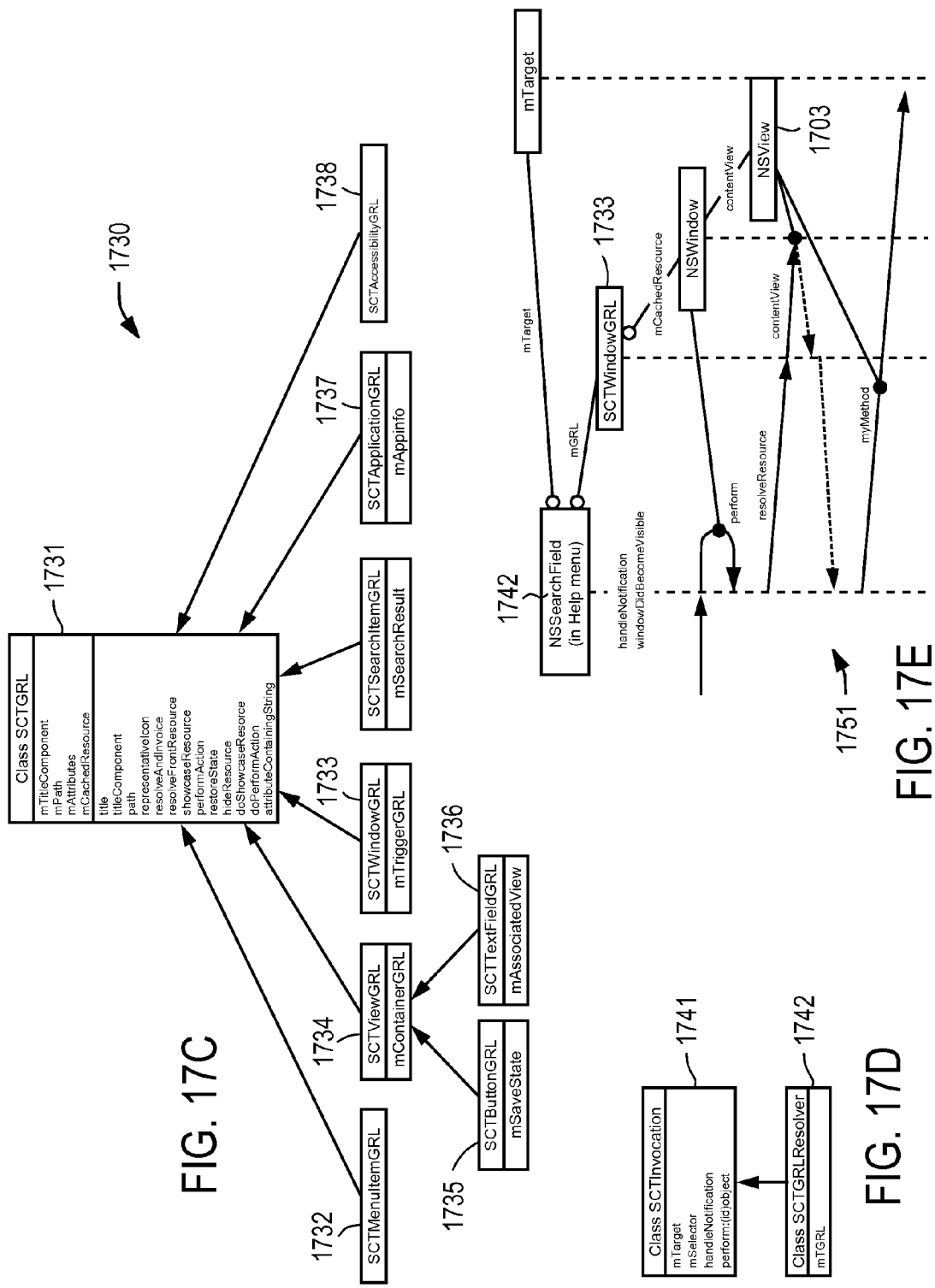

SEARCHING FOR COMMANDS AND OTHER ELEMENTS OF A USER INTERFACE

CROSS-REFERENCES TO RELATED APPLICATIONS

This application is a continuation of pending U.S. patent application Ser. No. 11/496,006, filed Jul. 28, 2006 which is a continuation-in-part of pending U.S. patent application Ser. No. 10/985,630, filed Nov. 10, 2004 each of which is incorporated by reference in its entirety. The present application is related to pending U.S. patent application Ser. No. 10/431,424 filed May 6, 2003, the disclosure of which is incorporated herein by reference.

FIELD OF THE INVENTION

The present invention relates generally to search functionality for a user interface, and more particularly to techniques for searching for commands within menus and other interface elements of a user interface.

BACKGROUND OF THE INVENTION

As software applications and operating systems become increasingly complex, the number of commands, options, and dialog boxes grows. As a result, users (particularly novice users) have a difficult time finding a command or element they are looking for. A user may know the general nature of the command he or she is looking for, but may not know which menu or dialog box contains that command. Searching among various menus (including hierarchical menus) and/or consulting printed or electronic documentation can be frustrating and time-consuming. Customization of user interfaces can make the task of finding a desired command more difficult, as a particular command may be found in different locations in different variations of the software product.

In particular, when a new version of a software application or operating system is released, it is common for commands to be moved from one place to another; users who are used to the previous version of the software application or operating system may be unfamiliar with the new locations of commands.

Once a user has become familiar with the organizational scheme for the software application, he or she can more easily find a particular command when it is needed. Accordingly, it would be beneficial to have a mechanism for training the user as to the locations of various commands, without forcing the user to consult manuals or other documentation. It would further be beneficial to provide a mechanism that makes it unnecessary for users to memorize the location of commands.

In this context, what is needed is a system and method for assisting a user in locating and accessing commands such as those within a menu structure, even when the user is unfamiliar with the organizational scheme for the software application. What is further needed is a system and method for training the user so that, over time, he or she becomes more familiar with the locations of various elements of a user interface, including for example commands within a menu structure. What is further needed is a system and method for providing a convenient way for both novice and advanced users to navigate a user interface, and for providing a mechanism that avoids the need for users to memorize the location of commands in a user interface. What is further needed is a system and method for integrating search functionality for user interface elements with other search functionality of a software application and/or operating system.

SUMMARY OF THE INVENTION

The present invention provides a search capability to allow a user to easily locate commands within menus, dialog boxes, or windows of a software application or operating system. In one embodiment, a user enters a search term (or a portion thereof) in a search field. The user is presented with a results menu containing a list of matches. The user selects the desired item from the results menu, and the corresponding command or other user interface element is displayed in its context within a menu, dialog box, window, or the like.

In one aspect, as the user enters the search term (or as he or she starts typing the search term, so that only a portion thereof has been entered), a list of results is presented. The user can navigate among the results by clicking on directional keys on a keyboard. The user can also click or hover over various results. In one aspect, as the user selects various results, corresponding user interface elements are brought into view in context, and (optionally) highlighted, so that the user can better understand the navigational structure of the user interface and the arrangement of commands therein. The user can initiate a command by activating (for example by clicking on) a displayed result corresponding to the command.

In one aspect, even before the user selects among displayed results, certain menu headings within the menu structure are highlighted automatically. Specifically, those headings that represent menus containing items that match the search term (such as menu commands containing the term, or menu commands that activate dialog boxes containing the term), are highlighted. These results may be updated dynamically as the user continues to enter the search criteria. In one aspect, other user interface elements may be highlighted as the user is entering the search term. For example, icons or buttons on toolbars may be highlighted when they correspond to commands or dialog boxes that contain text matching the characters that the user has so far entered.

In one aspect, different types of highlighting are used depending on the degree of certainty as to which menu or other user interface element is likely to contain the correct match. When there is relative uncertainty as to which menu, dialog box, command, or other element is being sought, menu titles or other user interface elements corresponding to commands containing the search term are highlighted using a first type of highlighting. When sufficient search term input has been provided that yields greater certainty as to which item is being sought, a second, more prominent type of highlighting is used.

By highlighting icons and items in this manner, the present invention provides a training mechanism that allows a user to learn, over time, where to find various menu commands and/or other user interface elements. In one embodiment, this training mechanism is implemented in a manner that is relatively innocuous, in that it does not interfere with the user's normal operation of the system. The present invention provides a mechanism that avoids the need for users to memorize the location of commands in a user interface In one aspect, the results menu is updated automatically as the user types in the search field. Thus, the user need not hit Enter, or any other key, to activate the search functionality of the present invention.

The functionality of the present invention is not limited to menu commands. As described in more detail below, the present invention can be implemented in any context where it is desirable to dynamically locate and/or highlight user interface items in response to a search term, while the search term is being entered.

In one aspect, the present invention searches for alternative terms as well as literal matches. Common misspellings, descriptive text, and/or alternative terminologies are associated with controls, so that if the user enters a search term that is misspelled or that uses alternative terminology, a match is still indicated.

In one aspect, the functionality of the present invention is integrating with other search functionality. Thus, the user can enter a query term and see results that include user interface elements, documents, messages, and/or other results that match the query term.

BRIEF DESCRIPTION OF THE DRAWINGS

The accompanying drawings illustrate several embodiments of the invention and, together with the description, serve to explain the principles of the invention.

FIG. 6 is a block diagram depicting a functional architecture for implementing the invention according to one embodiment.

FIG. 17A depicts an overview of classes and relationships for implementing the present invention according to one embodiment.

FIG. 17B depicts an event trace depicting the flow of control that takes place when a user enters text in a field according to one embodiment.

FIG. 17C depicts a class hierarchy 1730 for GRLs, according to one embodiment.

FIG. 17D depicts a SCTInvocation class and a SCTGRL-Resolver class.

FIG. 17E depicts an example of a process of resolving a window to its content view based on a windowDidBecomeVisible notification.

One skilled in the art will recognize that these Figures are merely examples of the operation of the invention according to one embodiment, and that other user interface arrangements and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

For illustrative purposes, the invention is described in connection with a mechanism for searching for menu commands within a user interface of a software application or operating system. Various specific details are set forth herein and in the Figures, to aid in understanding the present invention. However, such specific details are intended to be illustrative, and are not intended to restrict in any way the scope of the present invention as claimed herein. In particular, one skilled in the art will recognize that the invention can be used to assist the user in locating other types of user interface elements, including for example dialog boxes and elements thereof, toolbar icons, and the like. In other words, in the following description, menu commands are merely an example of items to be located. In addition, the particular screen layouts, appearance, and terminology as depicted and described herein, are intended to be illustrative and exemplary, and in no way limit the scope of the invention as claimed.

Figure 15:
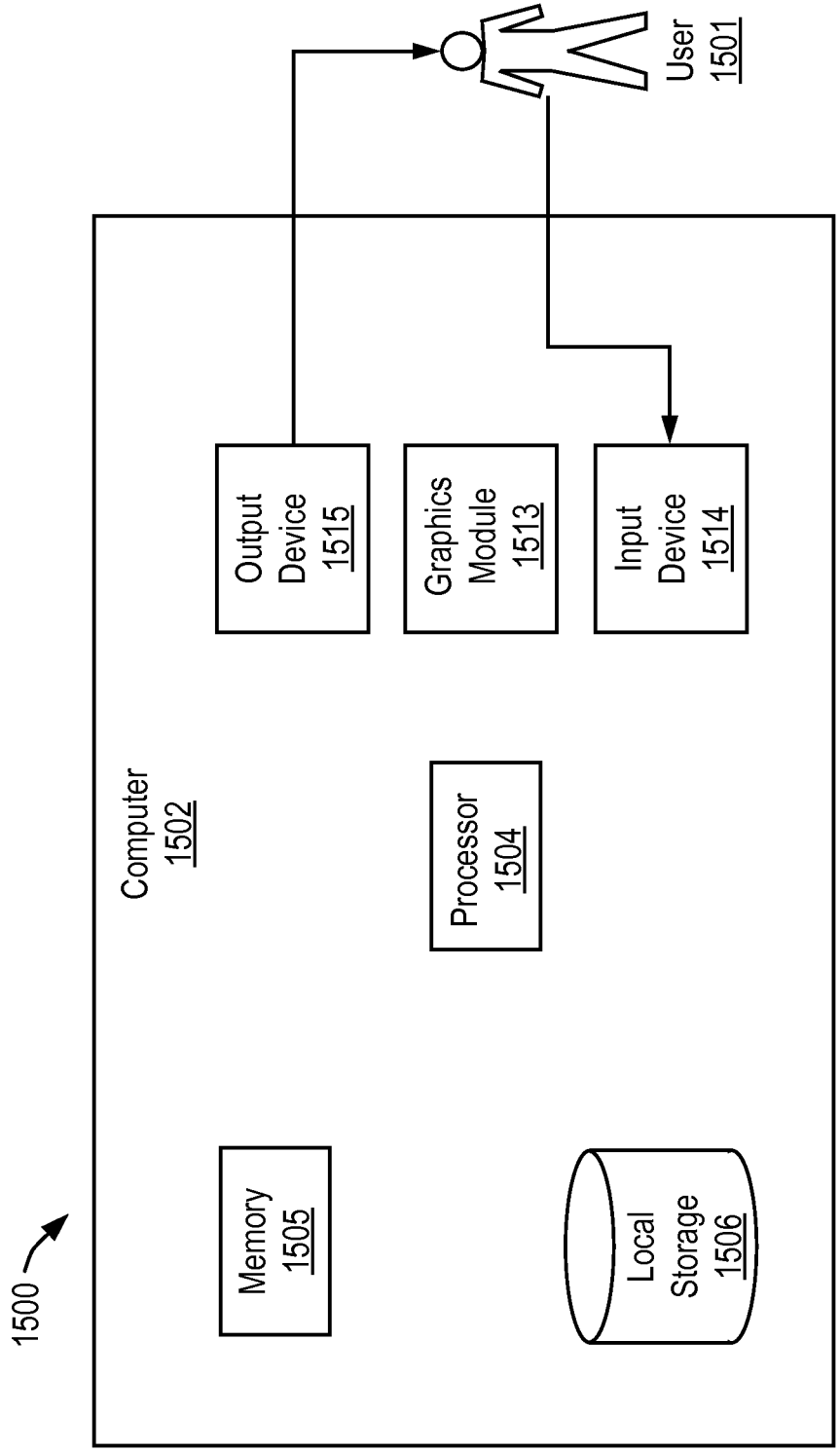
FIG. 15 is a block diagram depicting an architecture for practicing the present invention according to one embodiment.

Referring now to FIG. 15, there is shown a block diagram depicting an architecture for practicing the present invention according to one embodiment. In one embodiment, the present invention is implemented in a conventional personal computer system 1502, such as an iMac, Power Mac, or Power-Book, (available from Apple Computer, Inc. of Cupertino, Calif.), running an operating system such as MacOS X (also available from Apple Computer, Inc.). Computer 1502 includes a processor 1504, memory 1505, local storage 1506, one or more input devices 1514 (such as keyboard, mouse, and the like), and one or more output devices 1515 (such as display screen). In one embodiment, a graphics module 1513 is included for generating and rendering the graphic presentations for displaying user interface screens and elements according to the techniques described herein. User 1501 provides input via input device 1514 and receives output via output device 1515.

It will be recognized that the invention may be implemented on other devices as well, such as handhelds, personal digital assistants (PDAs), mobile telephones, consumer electronics devices, embedded devices, and the like.

Figure 13:
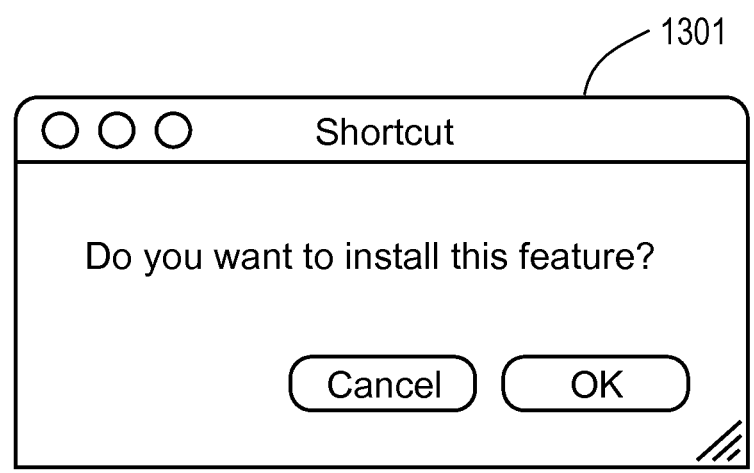
FIG. 13 is a screen shot showing an install dialog box according to one embodiment.

The invention may be embodied in software that runs on the personal computer. The invention may be included as add-on software, or it may form part of the operating system itself, or it may be a feature of an application that is bundled with the computer system or sold separately. In one embodiment, the user can choose whether to install the feature. Referring now to FIG. 13, there is shown an example of a dialog box for installing the feature that implements the present invention. The user can click OK or Cancel to select whether or not to install the feature.

The various features of the invention as described herein include output presented on a display screen that is connected to the personal computer. In addition, the invention makes use of input provided to the computer system via input devices such as a keyboard, mouse, touchpad, or the like. Such hardware components, including their operation and interactions with one another and with a central processing unit of the personal computer, are well known in the art of computer systems and therefore are not depicted here. Several Figures are presented as screen shots depicting examples of the user interface as it might appear on a display screen or other output device.

Method

Figure 11:
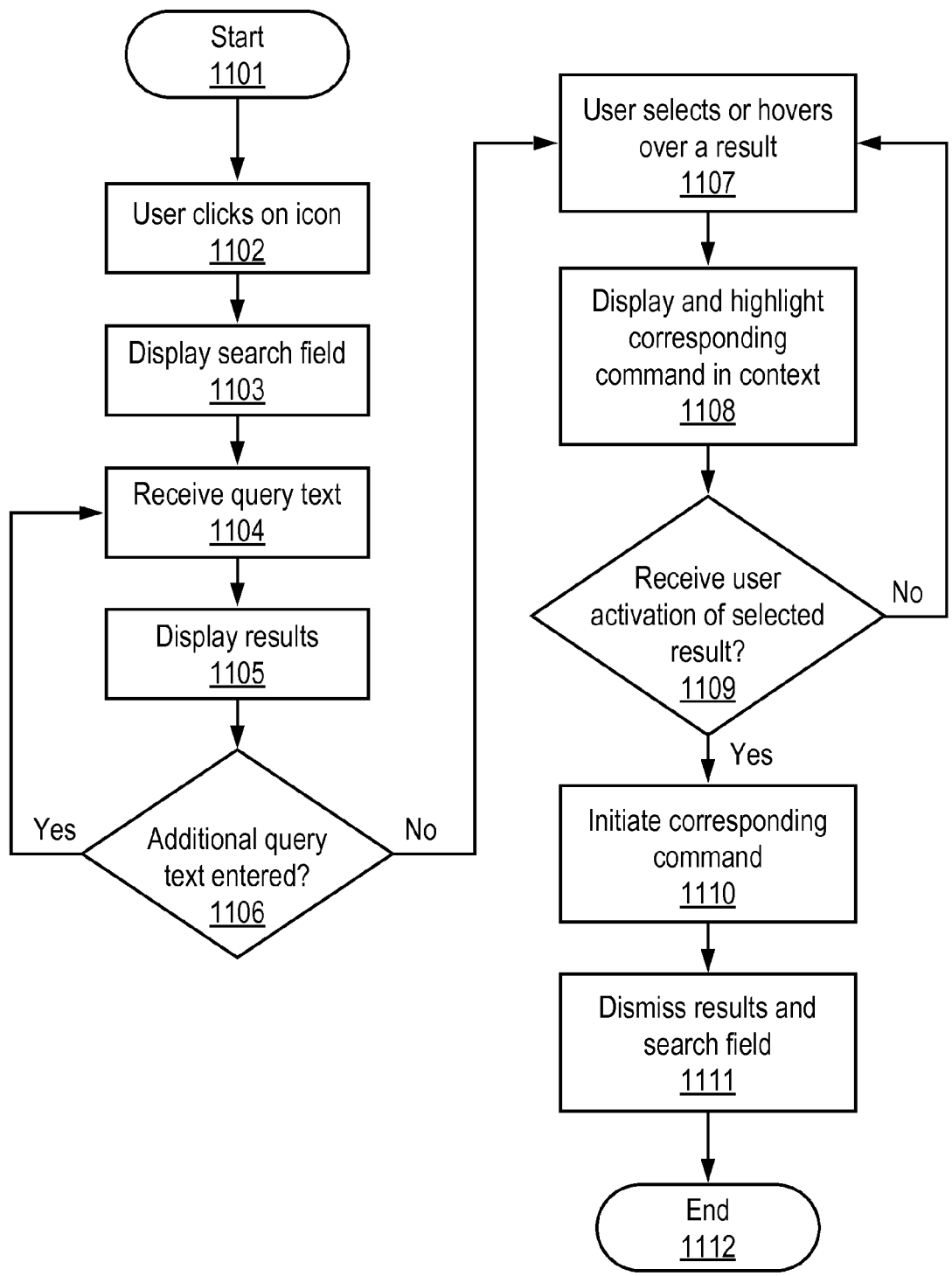
FIG. 11 is a flow diagram depicting a method for practicing the present invention according to one embodiment.

Referring now to FIG. 11, there is shown a flow diagram depicting a method for practicing the present invention according to one embodiment.

Figure 1:
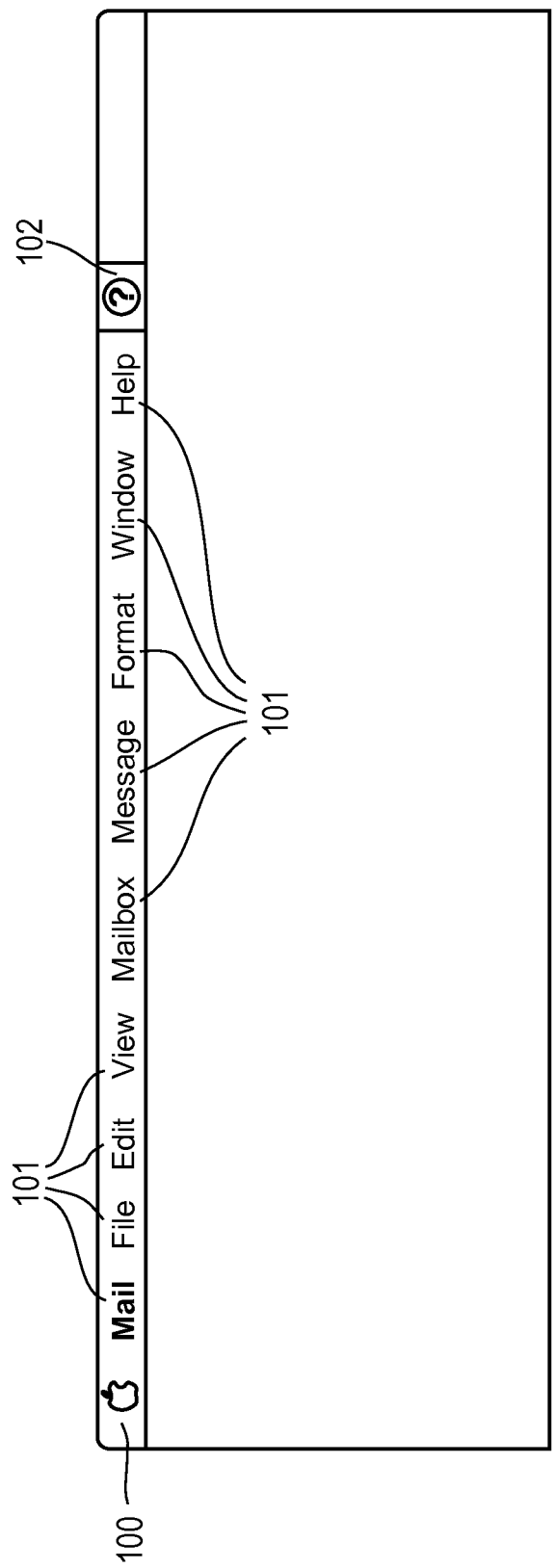
FIG. 1 is a screen shot depicting an example of a menu bar including an icon for initiating a search function according to one embodiment of the present invention.

Referring also to FIG. 1, there is shown a screen shot depicting an example of a menu bar 100 including a number of menu headings 101 and an icon 102 for initiating a search function according to one embodiment of the present invention. In the example of FIG. 1, icon 102 is located within menu bar 100, although one skilled in the art will recognize that icon 102 can be located anywhere within the display area of the screen. In one embodiment, icon 102 is consistently shown as the rightmost item within menu bar 100 in every application. Alternatively, the search functionality described herein can be activated by a keyboard command, voice command, touch command, or by any other mechanism that may or may not correspond to an on-screen icon such as 102.

Figure 2:
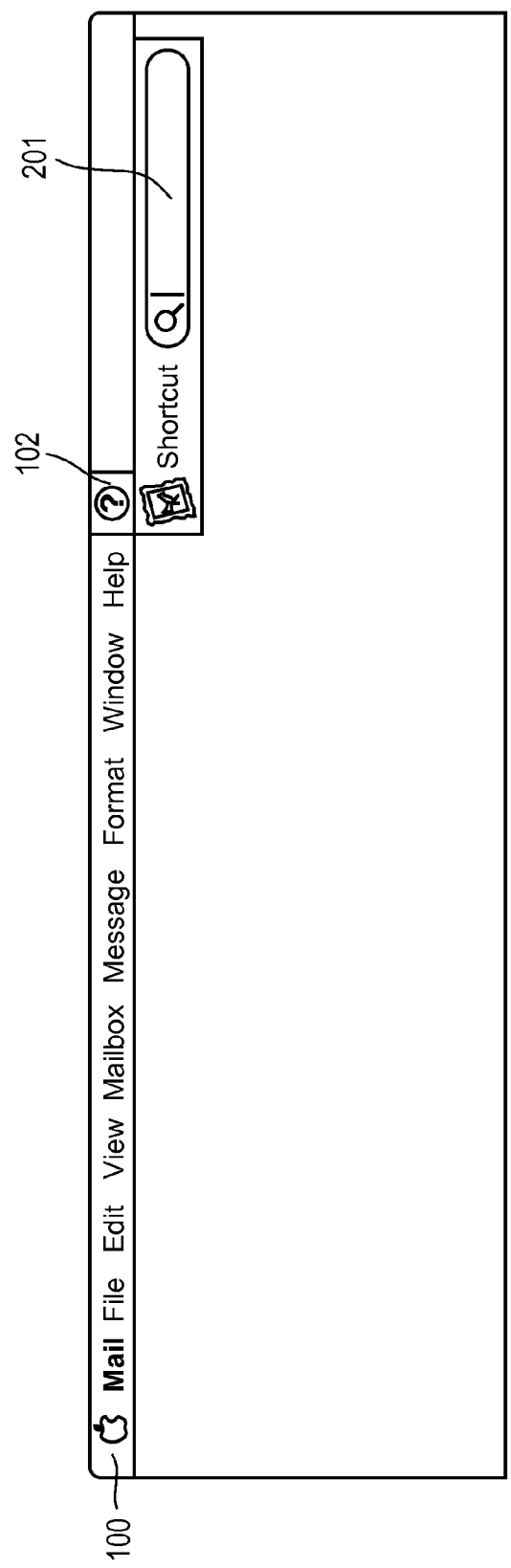
FIG. 2 is a screen shot depicting an example of a query field for entering a search query according to one embodiment of the present invention.

The present invention makes it easier for a user to find a particular menu command or other user interface element when he or she does not know where the command is located within the user interface. The user clicks 1102 on icon 102 to cause a search field 201 to be displayed 1103, as shown in FIG. 2.

Figure 3:
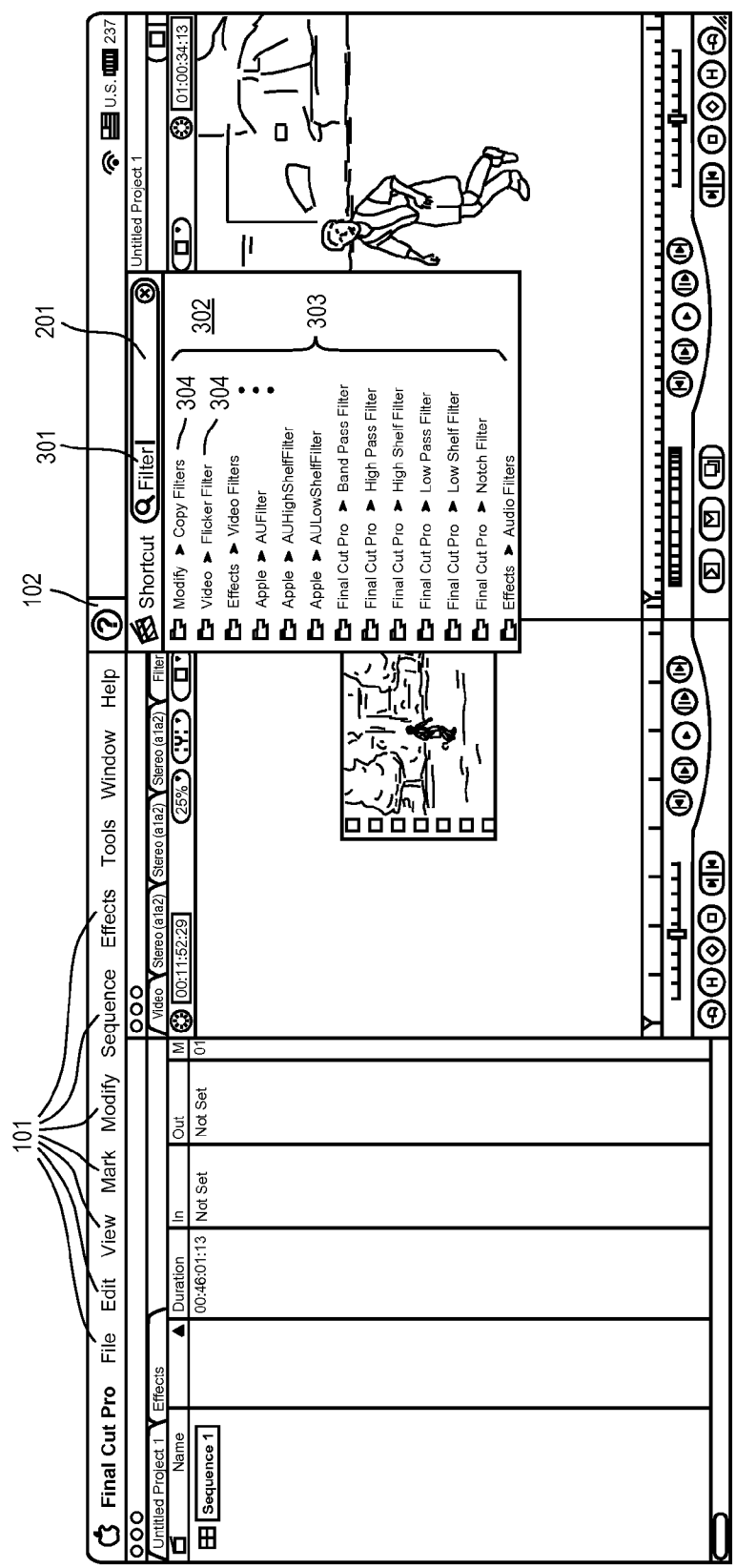
FIG. 3 is a screen shot depicting an example of a menu including a results list for a search query according to one embodiment of the present invention.

The system of the present invention receives 1104 query text 301 forming at least part of a search query entered by the user in search field 201. Referring now to FIG. 3, as the user enters query text 301, results 304 are displayed 1105. In one embodiment, menu 302 appears, showing a list 303 of search results 304 corresponding to commands that at least partially match the entered text. If the user enters 1106 additional text, the method returns to steps 1104 and 1105 to display new results for the updated query text 301.

In the example shown in FIG. 3, the user has entered "filter". Menu 302 includes search results 304 that contain the text string "filter". For some of the listed search results 304, a path to the corresponding command is shown, to help the user understand the menu structure so that he or she can better locate the command in the future without necessarily performing another search. For example, for a Video Filters command within the Effects menu, menu 302 includes the path "Effects->Video Filters". This tells the user that the Video Filters command can be accessed by opening the Effects menu.

In one embodiment, as the user enters query text 301, menu headings 101 that contain commands matching the entered text 301 are highlighted using a distinctive glowing or spotlight effect. This effect may be the same as the spotlight effect described herein and applied to matching commands 504, or it may be a different type of highlight, or any other mechanism for directing attention to particular commands 504 and/or UI elements. For example, an arrow or other type of pointer can be displayed. In some contexts a tactile mechanism (e.g. vibration) can be provided.

Figure 14:
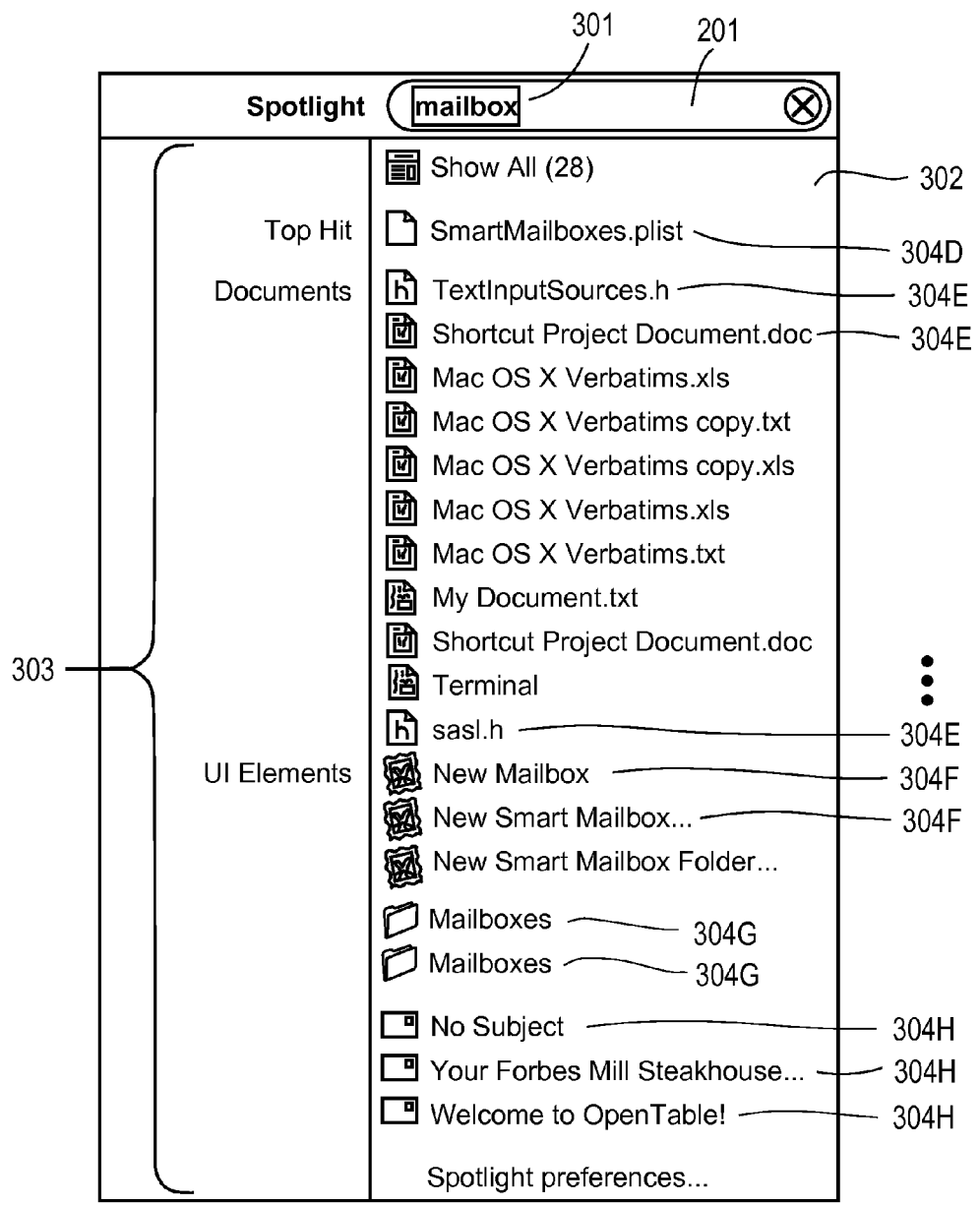
FIG. 14 is a screen shot showing an example of results menu presenting search results that include user interface elements as well as other locations where query text was found.

Referring now to FIG. 14, there is shown an embodiment where menu 302 presents search results 304 that include user interface elements as well as other locations where the query text 301 was found. The UI element results can be integrated with other results or they can be listed in a separate section of menu 302 or list 303 (or in a separate menu 302 or list 303). In addition, certain types of results can be highlighted or displayed differently if desired.

For example, in FIG. 14 the query text 301 is the word "mailbox". Result 304D is a "top hit", indicating that it has been determined to be the most likely search result of interest to the user. Results 304E represent documents that contain query text 301. Results 304F represent user interface elements that contain query text 301. Results 304G represent folders whose titles contain query text 301. Results 304H represent mail messages containing query text 301. In one embodiment, the user can select which types of results are displayed and how they are displayed.

Accordingly, the functionality of the present invention can be implemented in or added to any search functionality for searching documents and/or other items, without requiring the user to access a separate menu or command to perform UI element searches.

In one embodiment, as will be described in more detail below in connection with FIG. 6, a search table 601 is maintained internally, and can be updated periodically if desired. In table 601, each command 504 is associated with one or more text strings and/or other metadata, including for example a title for command 504, other text that appears within a dialog box or other element associated with menu command 504, and/or alternative and descriptive text strings for command 504. Thus, search results list 303 in menu 302 can include not only names of commands 504, but also descriptive text and/or alternative text for which there is a match with query text 301. In one embodiment, search table 601 is constructed in advance by automatically grabbing all text that appears in and/or is associated with each command 504 (possibly omitting commonly used words such as prepositions, articles, and the like). In another embodiment, search table 601 is manually constructed by a developer, author, or other individual.

Accordingly, in one embodiment, results menu 302 includes some results 304 that do not themselves contain the query text 301 entered by the user, but that are associated with descriptive text and/or alternative text that does contain that query text 301. For example, referring now briefly to FIG. 5C, Include Original Attachment is associated with alternative text that specifies that it is used in the context of replying to an email message. In other words, users may be searching for an Include Original Attachment option, without realizing that the appropriate command 504 in which the option appears is actually the Reply command 504. Thus, when the user enters "reply" as query text 301, "Include Original Attachment" appears as one of the search results 304 listed in menu 302. Such alternative text can include common misspellings, as well as alternative terminology that may be used in other operating systems, or that may be commonly used by users or other individuals when referring to a particular feature or function.

Thus, search results as presented in menu 302 include not only those results 304 whose names match query text 301, but also includes results 304 corresponding to commands 504 that have matching descriptive or alternative terms. In one embodiment, results 304 that are semantically related to query text 301 are also included.

In one embodiment, menu 302 only includes results 304 corresponding to commands 504 that apply to installed features. If a particular hardware or software function is not installed on the user's computer, then any results 304 corresponding to commands 504 that apply to that feature are omitted from menu 302. In one embodiment, the exclusion of such results 304 is facilitated by maintaining, in table 601, keys that indicate the hardware and/or software configurations to which each entry in table 601 applies. If the hardware and/or software configuration for a particular entry in table 601 is not present in the system, the entry is excluded from searches. In one embodiment, if the user enters query text 301 that refers to an uninstalled feature, he or she is notified that the feature is not present (for example, by presenting a dialog box, or by placing explanatory text within menu 302). In one embodiment, the user is given an opportunity to click on a link or button to install the feature.

For example, if the user searches for BlueTooth in a system that does not have BlueTooth, any results 304 relating to BlueTooth-related commands 504 are omitted from the search results. A dialog box or other explanatory text is presented to explain to the user that the system does not have BlueTooth.

In one embodiment, when displaying a menu item representing an alternative terminology match, the alternative terminology is displayed alongside or instead of the menu item, so as to clarify the reason for the appearance of the item on menu 302. In another embodiment, only the alternative terminology appears as the menu item. In yet another embodiment, only the primary terminology appears, with no reference to the alternative terminology. In yet another embodiment, only the primary terminology appears, but it is displayed using some distinctive visual characteristic (such as a different color), or is accompanied by some indicator to clarify that it is an alternative text match.

Figure 5A:
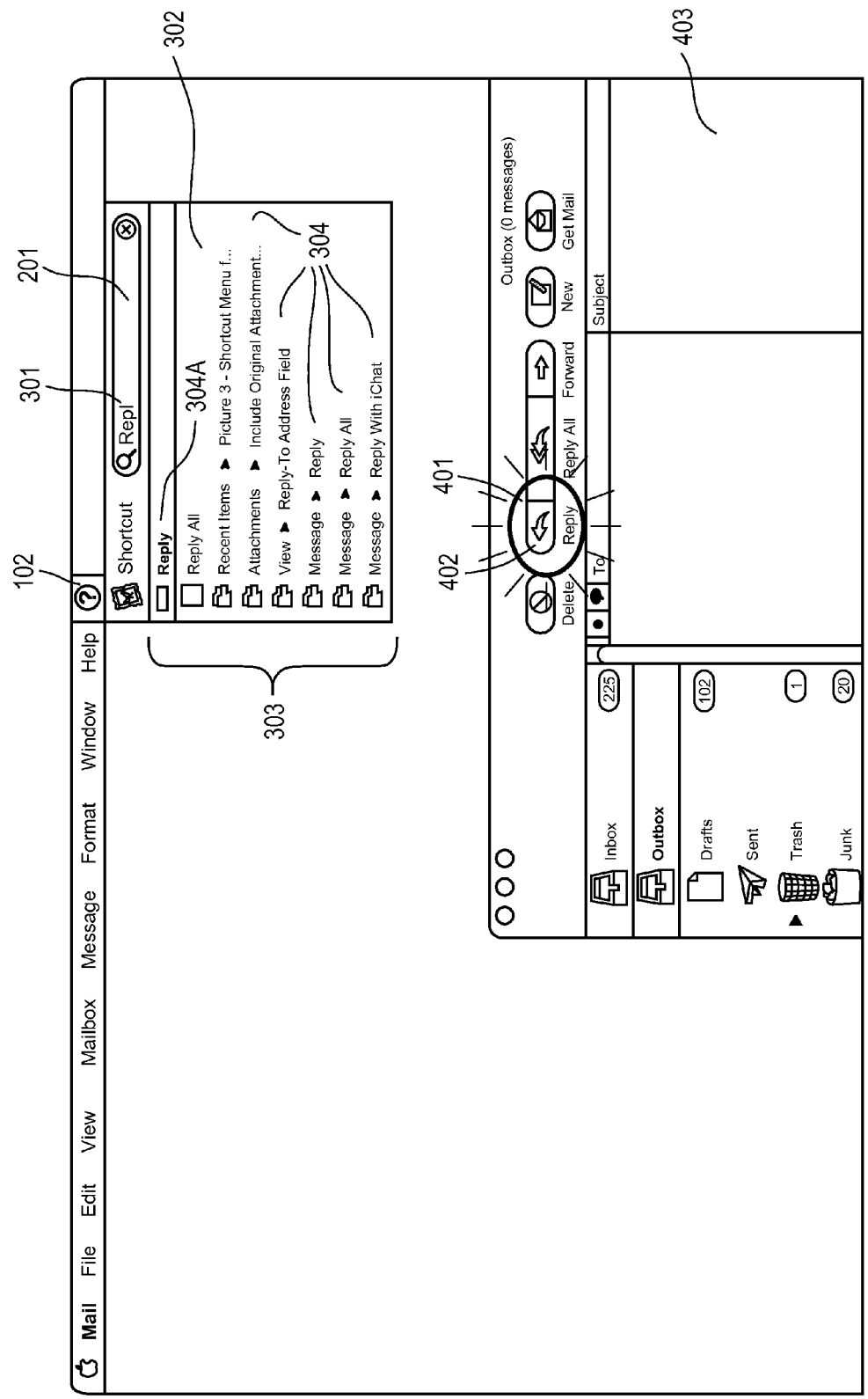
FIGS. 5A and 5B are screen shots depicting a technique for highlighting an on-screen button corresponding to a selected result in the results list according to one embodiment of the present invention.
Figure 5B:
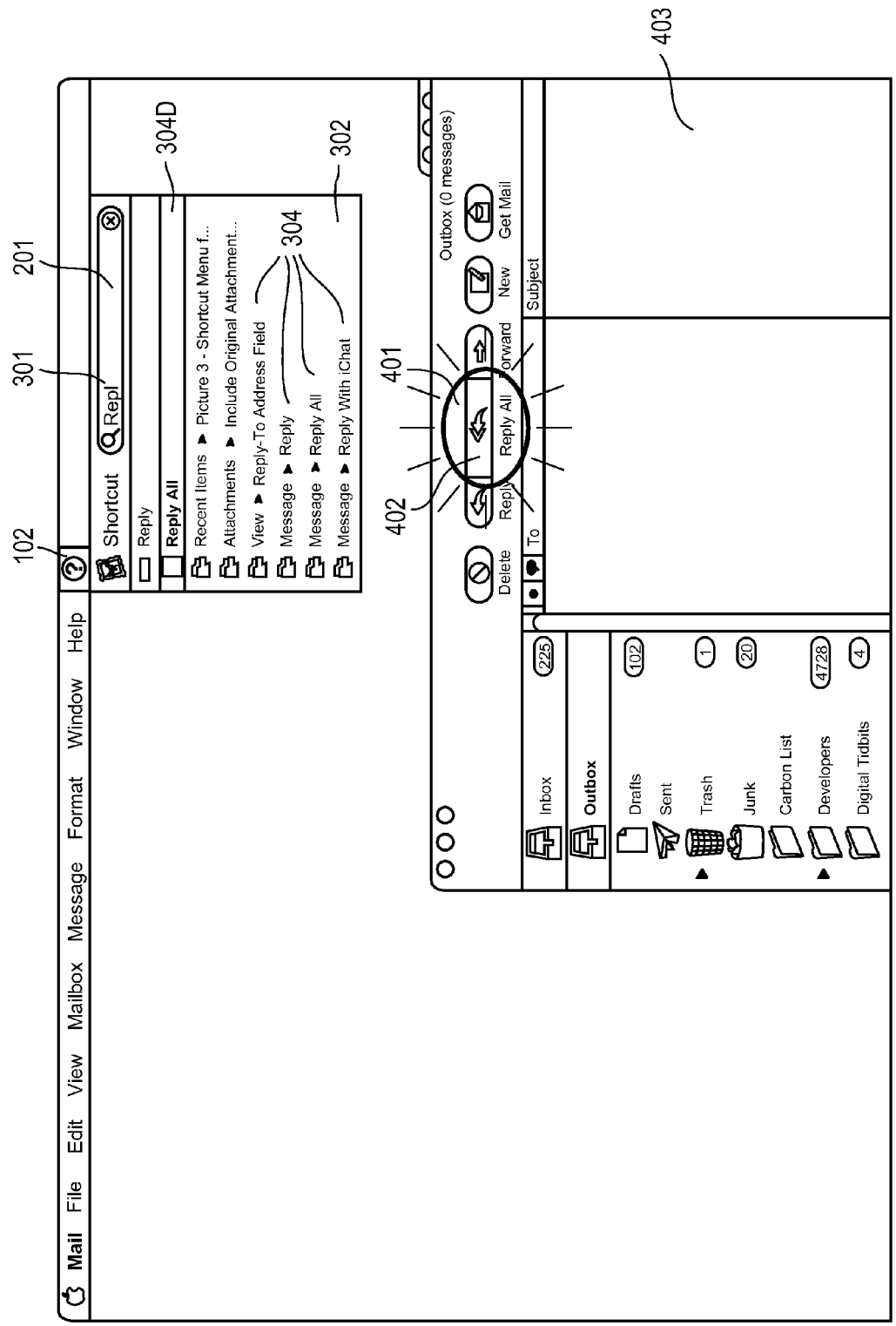

Referring again to FIG. 11, in one embodiment, the user can indicate an interest 1107 in one of the listed results 304, for example by clicking on it, hovering a mouse cursor over it, and/or selecting it via keyboard up/down arrow keys. In one embodiment, as the user selects 1107 items in this manner, corresponding user interface elements are brought into view and highlighted 1108. For example, referring now to FIGS. 5A and 5B, there are shown examples of a distinctive spotlight effect that can be used to highlight a user interface element 402 corresponding to a selected result 304A or 304D in menu 302. The spotlight effect is achieved by slightly darkening most of the display, except for a circular or oval-shaped area 401 immediately surrounding the element 402 to be highlighted. Thus, the circular area 401 appears slightly brighter than does the remainder of the screen, so that the overall effect is that of a spotlight shining on the highlighted element 402. The effect is reinforced by a gradual transition of brightness from the central area for the highlighted element 402 to the darker region. In alternative embodiments, the spotlight effect can be accomplished by brightening the area surrounding the highlighted element 402 and leaving the remainder of the screen at the same brightness as before. In yet other embodiments, other types of highlighting may be used.

In one embodiment, the user interface elements are highlighted automatically, so that the user need not select or otherwise indicate an interest in one of the listed results 304 in order to activate such highlights. For example, user interface elements 402 for all listed results 304 can simultaneously be brought into view and highlighted. Alternatively, user interface elements 402 for some subset of the listed results 304 can be brought into view and highlighted. For example, the N most likely matches can be shown and highlighted, with N being determined based on display limitations (because of the possible difficulty in displaying many menus and/or user interface elements 402 simultaneously) or other factors. Sequential highlighting can be used instead of simultaneous highlighting, with each of a number of user interface elements 402 (each corresponding to a listed result 304) being highlighted in turn.

In one embodiment, the menu (or element) that contains a result element 402 is highlighted first. Then, when the user selects or hovers over the containing element, the next step on the path to the result element 402 is highlighted. In this manner, the user is shown the path to follow to reach the result element 402, in a step-by-step manner. For example, searching for "Font Book" might cause "Finder" to be highlighted. When the user selects Finder, the "Services" menu is highlighted. When the user selects "Services", the Font Book menu item is highlighted.

"Highlighting," as used herein, is not limited to the specific spotlight effect described and illustrated. Rather, the term "highlighting" is intended to refer to any form of effect by which some user interface elements 402 or items are distinguished from others. Examples of such effects include changing the size, shape, color, contrast, and/or other visual features of the user interface element 402 or of the surrounding area. In other embodiments, highlighting refers to displaying one or more items in a specific area of the screen or window, or rearranging some items within a display area to indicate that they are highlighted. In yet other embodiments, highlighting is accomplished using nonvisual means; for example, highlighted items can produce a distinctive sound when pointed to by a cursor, or they can have a distinctive tactile characteristic. Other alternatives will be apparent to one skilled in the art.

Figure 12:
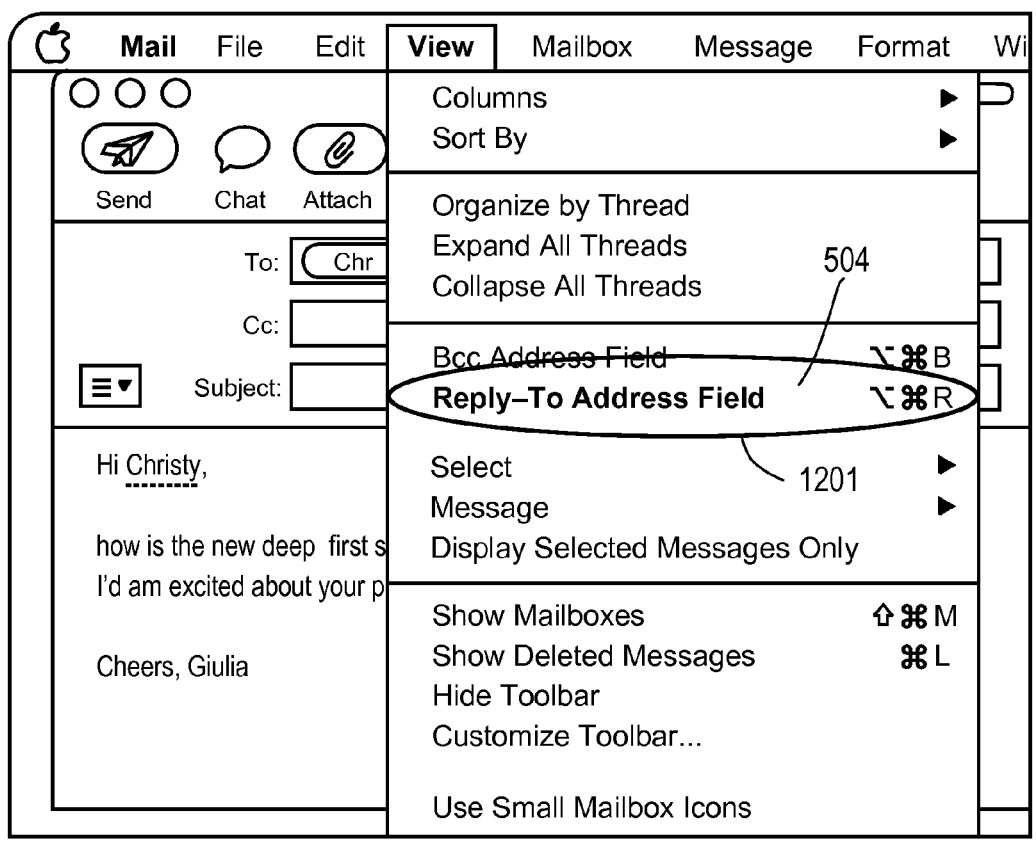
FIG. 12 is a screen shot depicting an alternative form of highlight for a menu command according to one embodiment.

One example of an alternative form of highlighting is shown in FIG. 12, where an oval 1201 (or other shape) is drawn around the highlighted menu command 504 or other element. The oval 1201 (or other shape) can be presented in a distinctive color, if desired.

In one embodiment, the presentation of menu 302 takes place automatically as the user types query text 301 in search field 201. Thus, the user need not hit an Enter key or otherwise manually activate the search command. The list 303 of results 304 in menu 302 is updated automatically as the user enters additional characters in field 201, or as the user hits the backspace key to delete characters. In general, typing additional characters lengthens query text 301 string, thus narrowing the search and causing menu 302 to include fewer items; conversely, deleting characters shortens query text 301 string, thus broadening the search and causing menu 302 to include more items. In one embodiment, processing is performed as each character is input, and feedback is provided substantially instantaneously upon receipt of the input, for example as described in U.S. Pat. No. 4,704,703 for "Dynamic Input Processing System."

In an alternative embodiment, searches are performed in response to a certain trigger event. For example, a search may be initiated or updated whenever the user pauses while typing query text 301; a predetermined minimum pause length can be established. Alternatively, a search may be initiated or updated when the user requests it, by hitting an Enter key or search button, or issuing a verbal command, or the like.

In one embodiment, when a user interface element 401 is brought into view and highlighted 1108 in response to user selection of a result 304, surrounding user interface elements are also displayed so as to provide context. For example, a menu, window, or dialog box containing the element 401 can be shown, so that the user can see where the element 401 is positioned in relation to other user interface elements. Referring again to FIG. 5A, for example, Outbox window 403 is shown, so that the user can see the context of reply button 402 within the overall user interface.

Referring also to FIGS. 16A to 16E, there are shown screen shots depicting an example of results menu 302 presenting search results, and examples of user interface elements being displayed in response to user highlighting of an item in results menu 302.

Figure 16A:
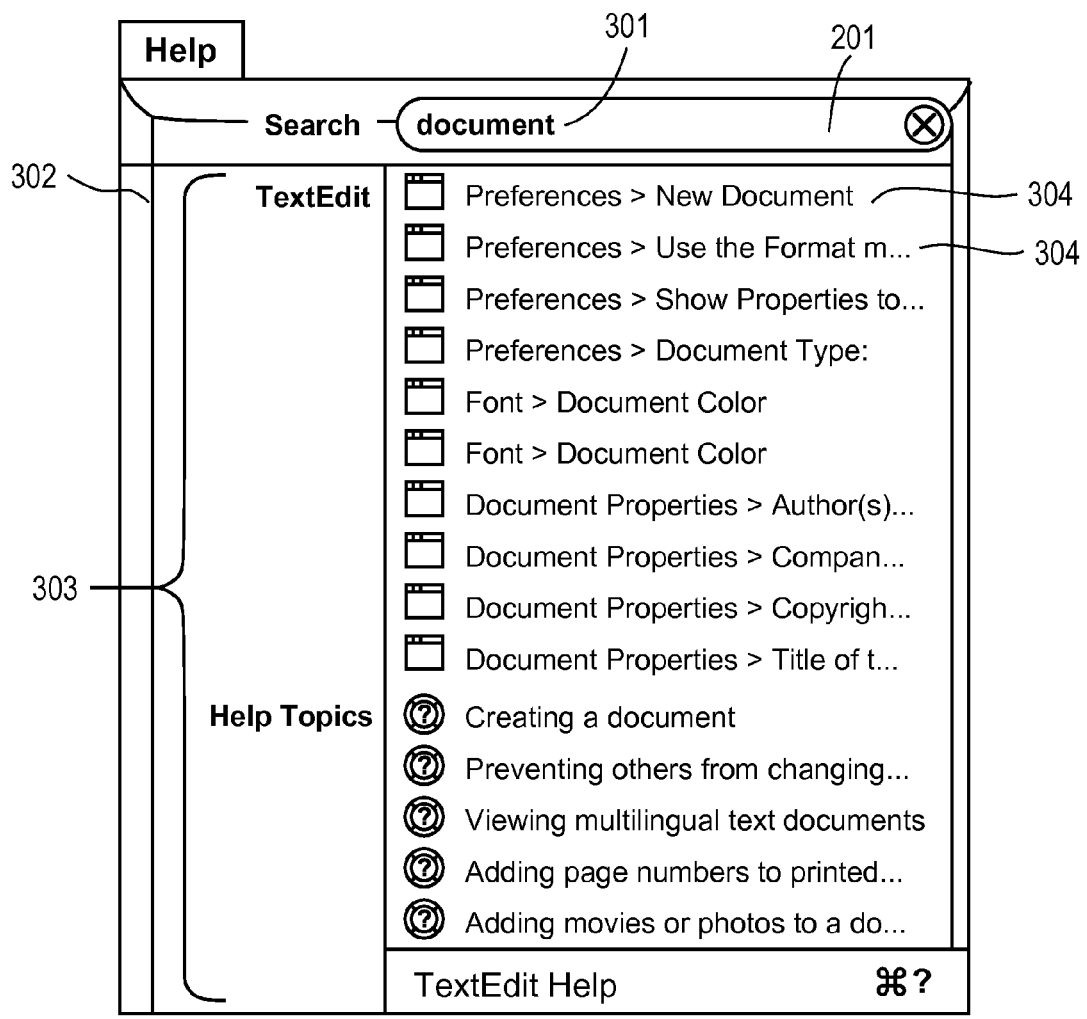
FIG. 16A is a screen shot depicting an example of results menu presenting search results in response to user entry of a search term according to one embodiment.

FIG. 16A depicts results menu 302 presented in response to user entry of query term 301 in field 201. Menu 302 includes list 303 of results 304 as described above. Results 304 can be highlighted by the user to cause a user interface element to be displayed along with relevant context. For example, the user can use arrow keys on a keyboard, or an onscreen cursor, to highlight any result 304 and cause the appropriate user interface context element(s) to appear on the screen.

Figure 16B:
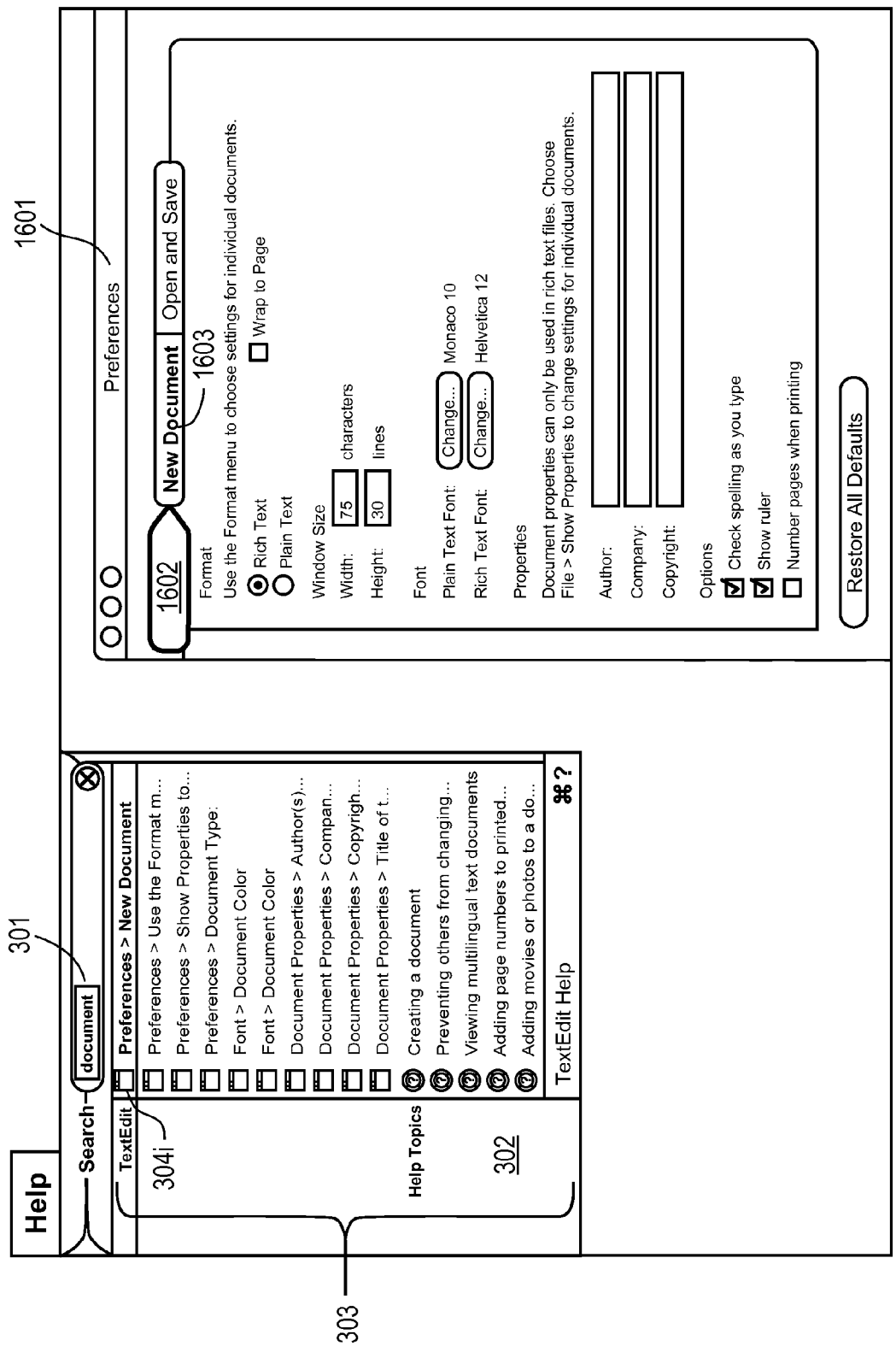
FIGS. 16B to 16E are screen shots depicting examples of user interface elements being displayed in response to user highlighting of an item in results menu.

In FIG. 16B, the user has highlighted "Preferences>New Document" result 304*i*. Preferences window 1601 is automatically displayed, and New Document item 1603 within window 1601 is shown. In this embodiment, the displayed item 1603 is highlighted in a different manner than described in connection with FIG. 5A. Here, arrow 1602 is shown pointing to item 1603. In one embodiment, arrow 1602 is presented in a distinctive color and is animated when first presented, so as to emphasize its importance and to draw attention to item 1603.

Figure 16C:
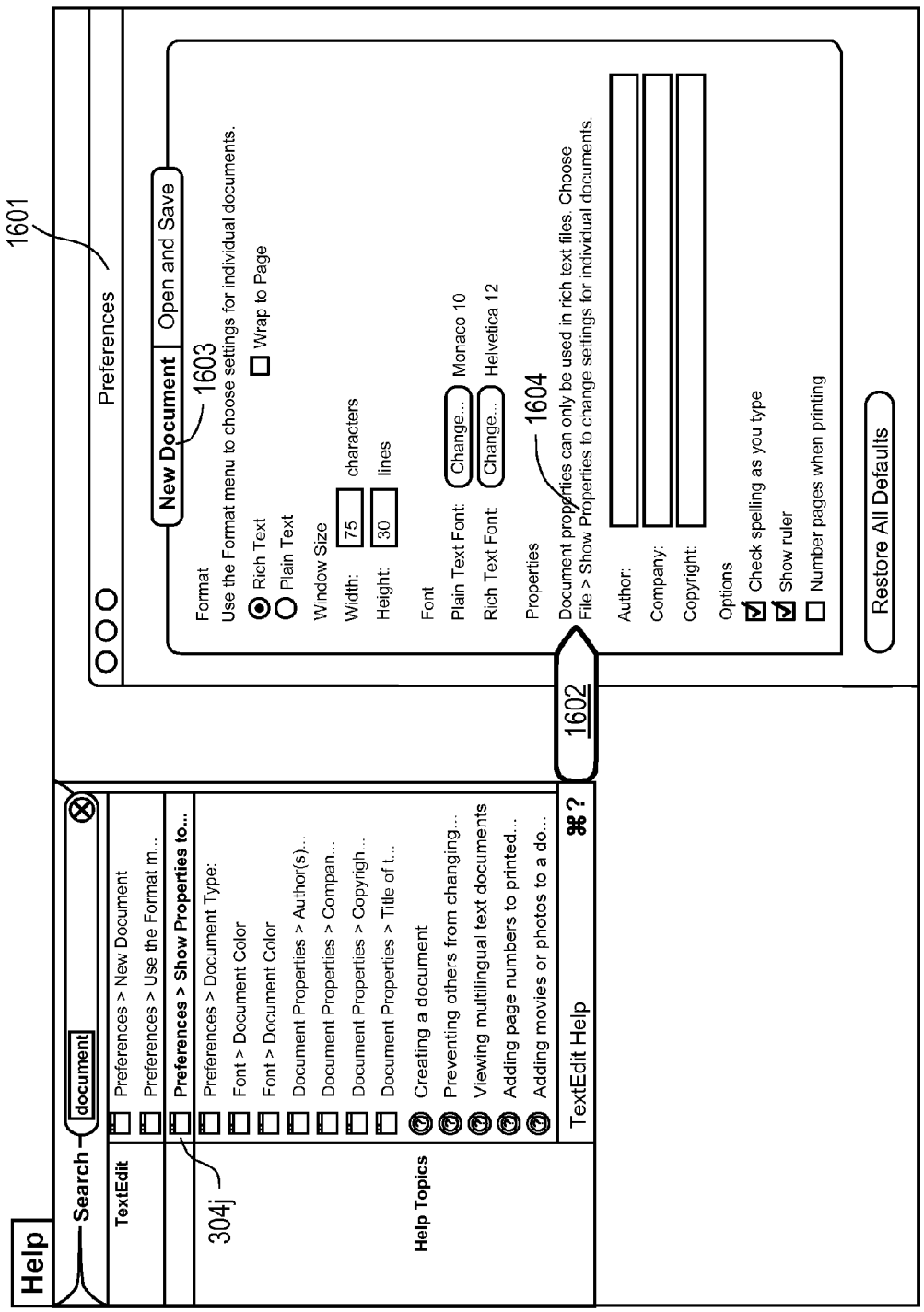

In FIG. 16C, the user has highlighted "Preferences>Show Properties . . . " result 304*j*. The corresponding user interface element 1604 is shown. Since element 1604 is presented within New document pane of Preferences pane 1601, New document item 1603 is activated so as to display the appropriate pane for showing element 1604. It can be seen, therefore, that when appropriate to display initially hidden elements, the method appropriate user interface elements are activated to cause the hidden elements to be displayed.

Figure 16D:
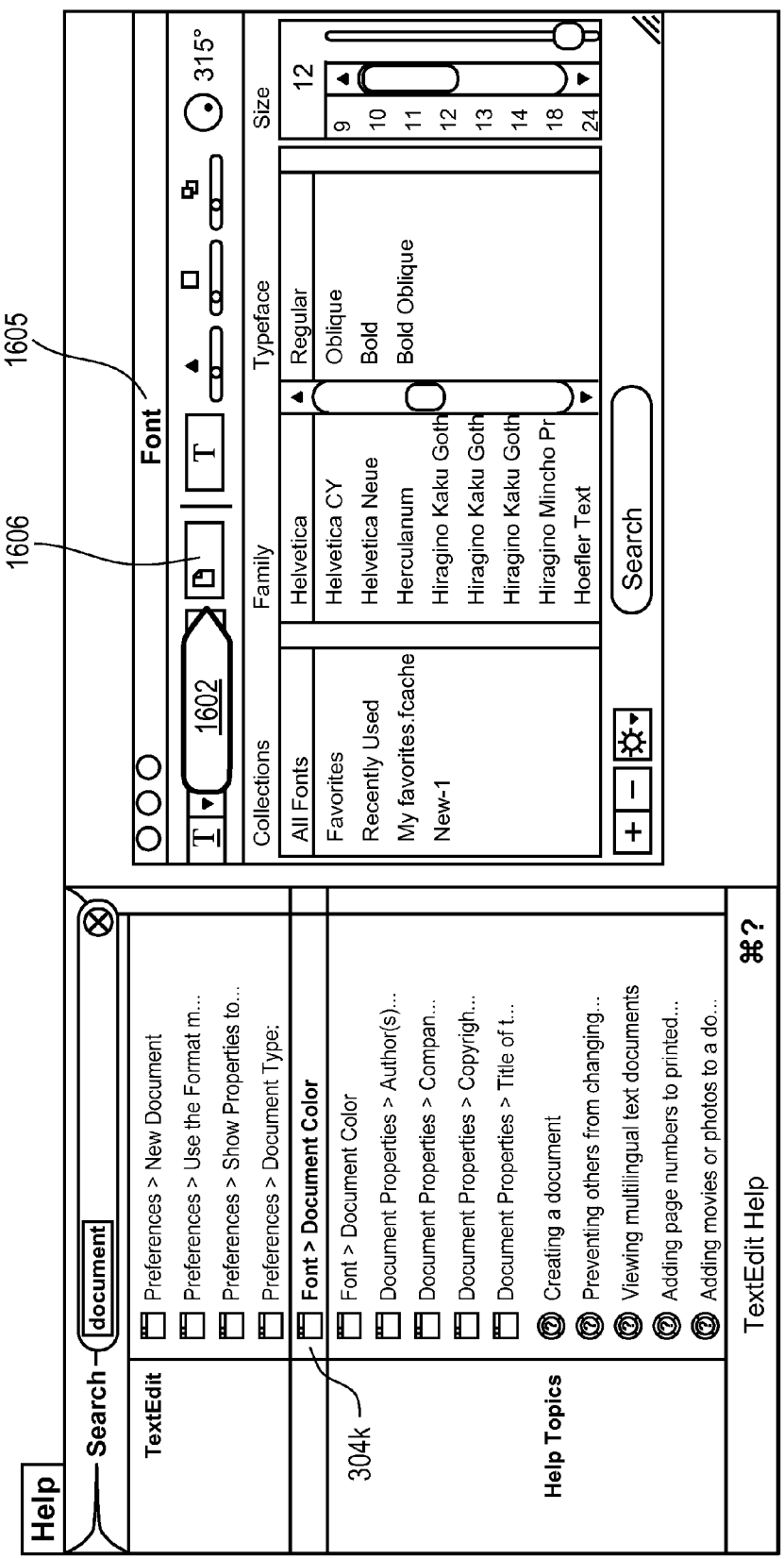

In FIG. 16D, the user has highlighted "Font>Document Color" result 304*k*. Font dialog box 1605 is shown, with arrow 1602 displayed and pointing to document color icon 1606.

Figure 16E:
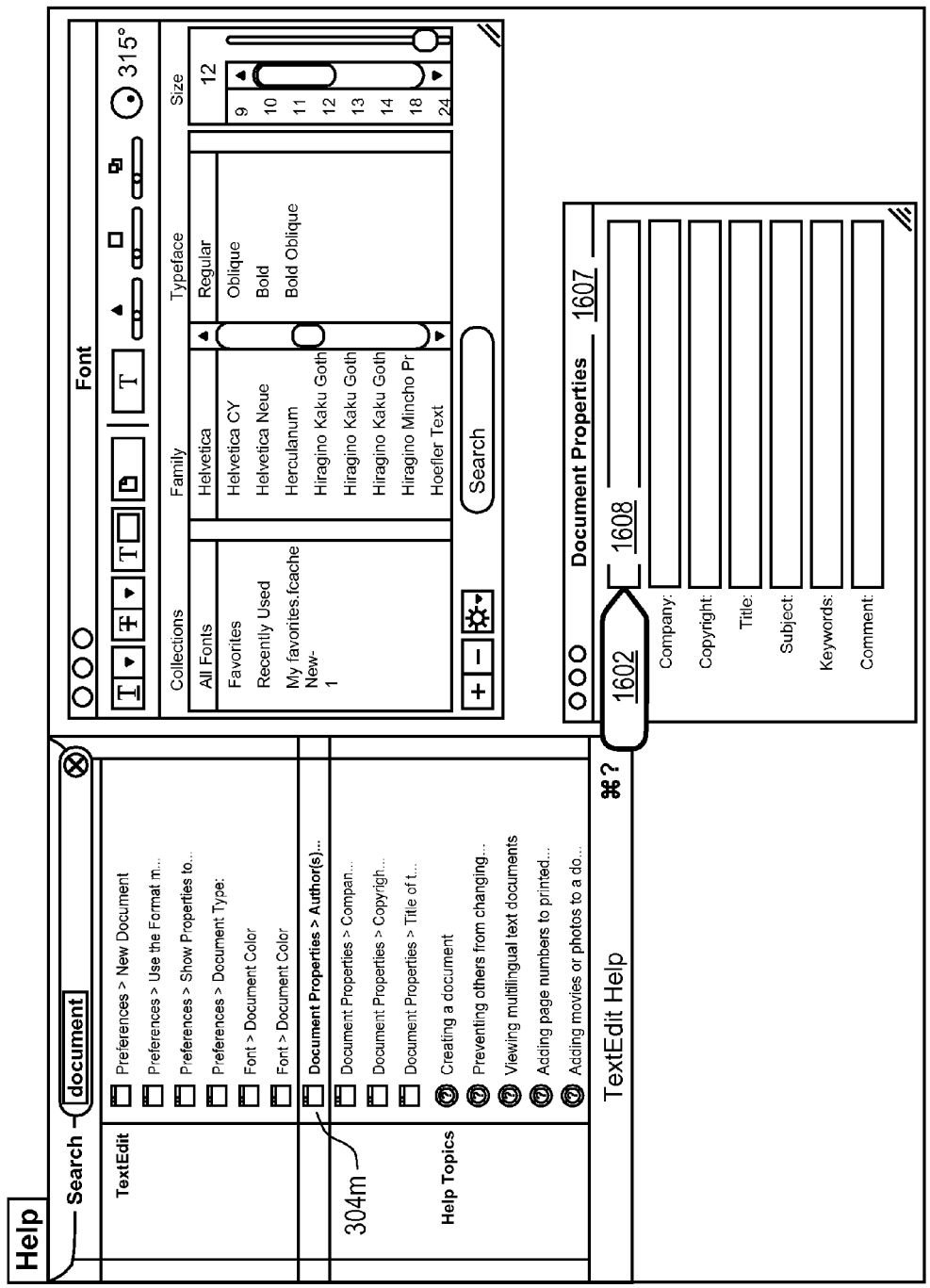

In FIG. 16E, the user has highlighted "Document Properties>Author(s)" result 304*m*. Document Properties dialog box 1607 is shown, with arrow 1602 displayed and pointing to author field 1608.

In one embodiment, the system of the present invention maintains a hierarchical representation of relationships among menus, windows, dialog boxes, and other user interface elements, so that the appropriate set of user interface elements can be displayed in order to reach the user element represented by the user-highlighted result item 304. Additional information describing the schema for the hierarchical representation is provided below.

In one embodiment, the user can activate 1109 the highlighted element 401 or any other displayed element. For example, in FIG. 5A, the user can click on and activate any button or icon in window 403, and is not limited to activating the highlighted element 401. In one embodiment, the user can activate the highlighted element 401 by clicking on it, or by clicking on the corresponding result 304A in menu 302, or by hitting Enter (or some other key) while result 304A is selected or highlighted. In response to user activation 1109 of a selected result 304 in menu 302, or of the corresponding element 401, the system of the present invention initiates 1110 the corresponding command and dismisses 1111 menu 302 and search field 201. In one embodiment, when the user activates result 304 from menu 302, the corresponding element or command momentarily blinks, so as to further reinforce the connection between results 304 and their corresponding elements or commands.

In one embodiment, an icon (not shown) is displayed adjacent to one or more results 304 in menu 302. Clicking on the icon causes the corresponding command or UI element to be brought into view, in a similar manner to that described above (for example, displaying the menu and/or window containing the command or user interface element).

In another embodiment, whenever one or more elements 401 are highlighted, non-highlighted user interface elements are temporarily disabled, although the user can click on a highlighted element 401 to activate it.

Figure 4A:
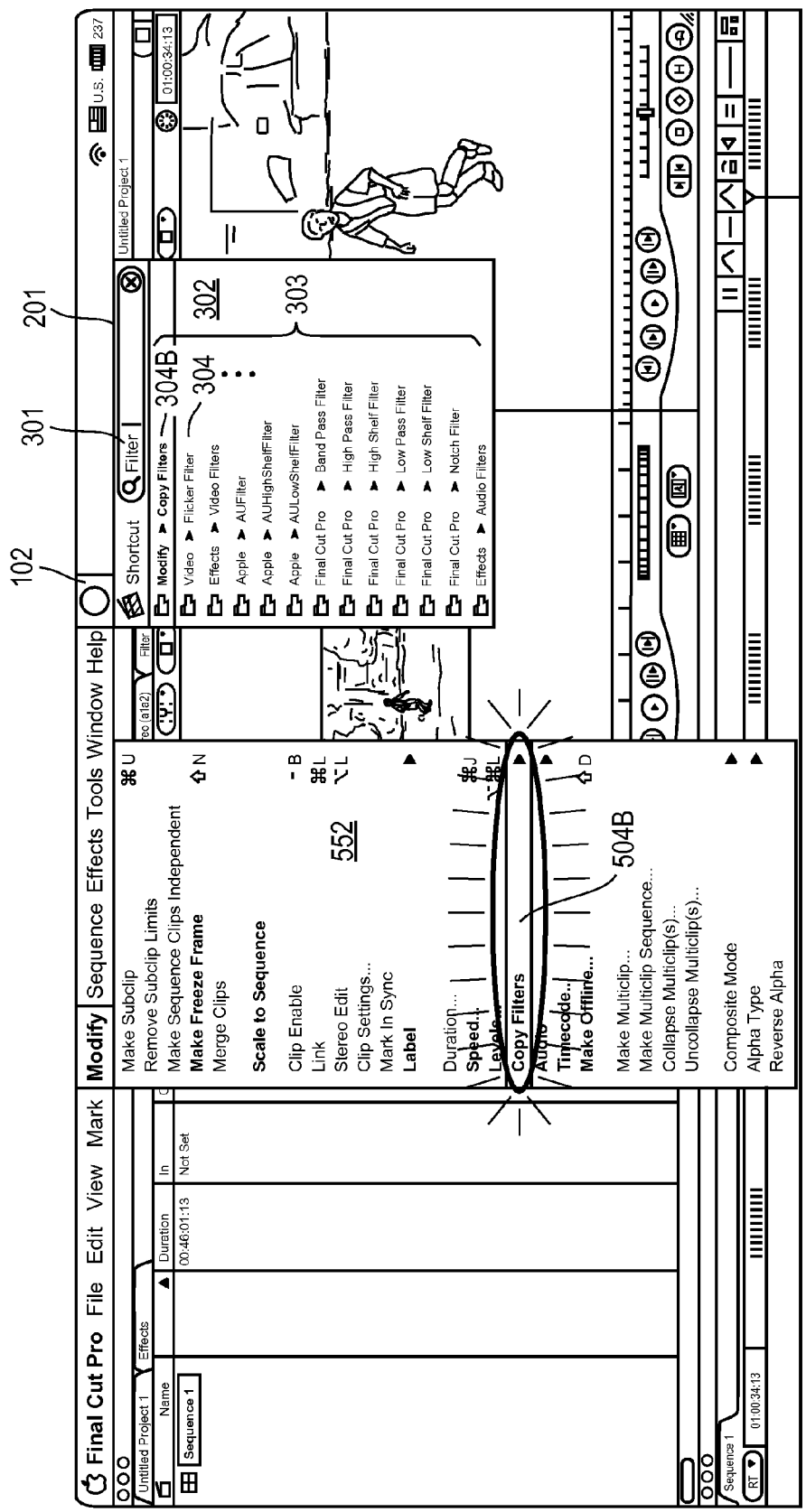
FIGS. 4A, 4B, and 4C are screen shots depicting a technique for highlighting a menu command corresponding to a selected result in the results list according to one embodiment of the present invention.

Referring now to FIG. 4A, there is shown an example where the selected search result 304B in menu 302 corresponds to a menu command 504B in menu 552. Accordingly, menu 552 is brought into view, and command 504B is highlighted using a spotlight effect.

Figure 4B:
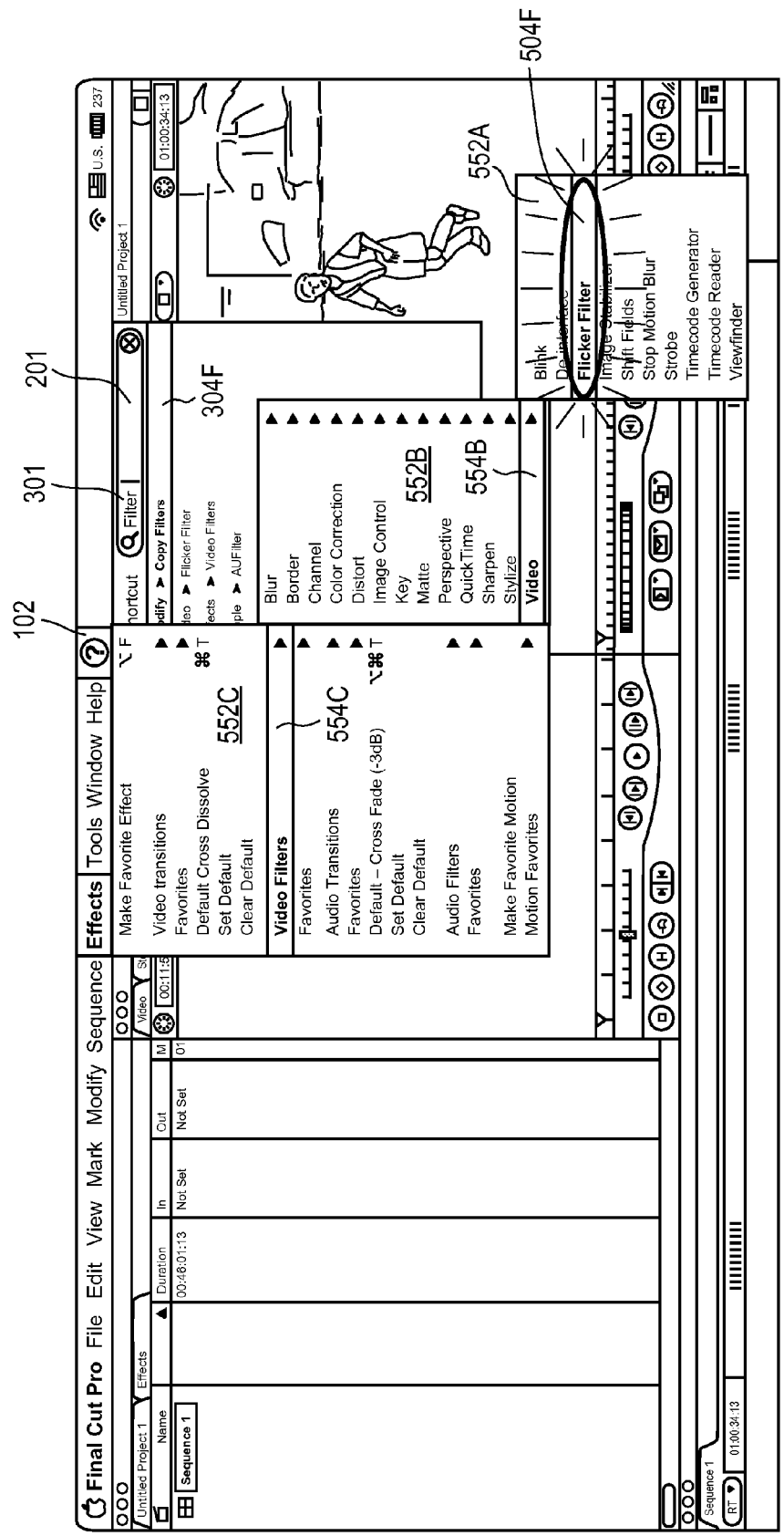

Referring now to FIG. 4B, there is shown an example where the selected search result 304F in menu 302 corresponds to a menu command 504F in menu 552A, which is a submenu of menu 552B, which is in turn a submenu of menu 552C. Accordingly, all three menus 552A, 552B, and 552C are brought into view to show the user the path to command 504F. Also, the commands 554B, 554C that are used to activate the respective submenus 552B, 552A are highlighted using standard inverse-video highlighting techniques.

Figure 4C:
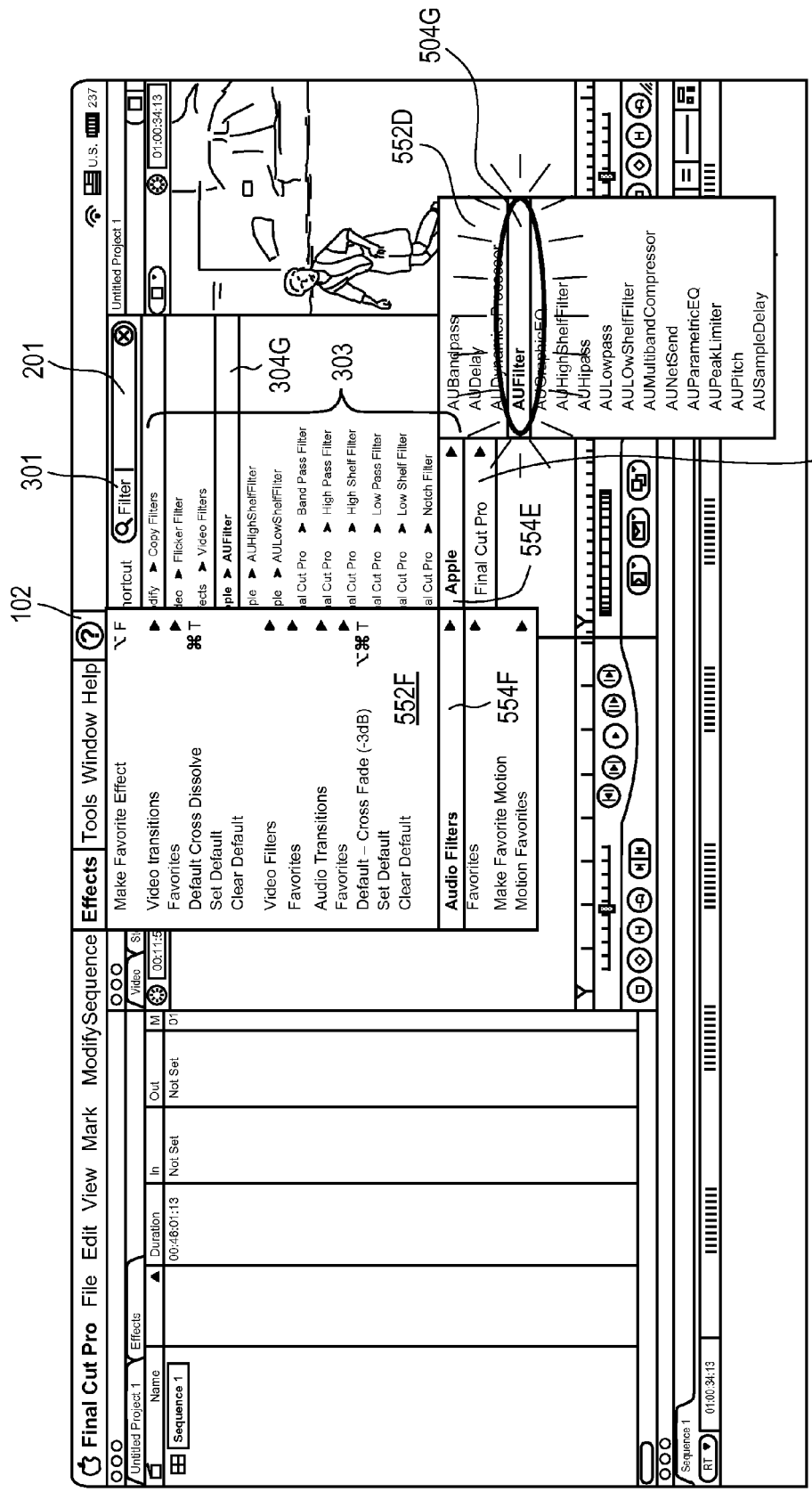

Similarly, FIG. 4C shows another example where the selected search result 304G in menu 302 corresponds to a menu command 504G in menu 552D, which is a submenu of menu 552E, which is in turn a submenu of menu 552F. Again, all three menus 552D, 552E, and 552F are brought into view to show the user the path to command 504G. Also, the commands 554F, 554E that are used to activate the respective submenus 552E, 552D are highlighted using standard inverse-video highlighting techniques.

Figure 5C:
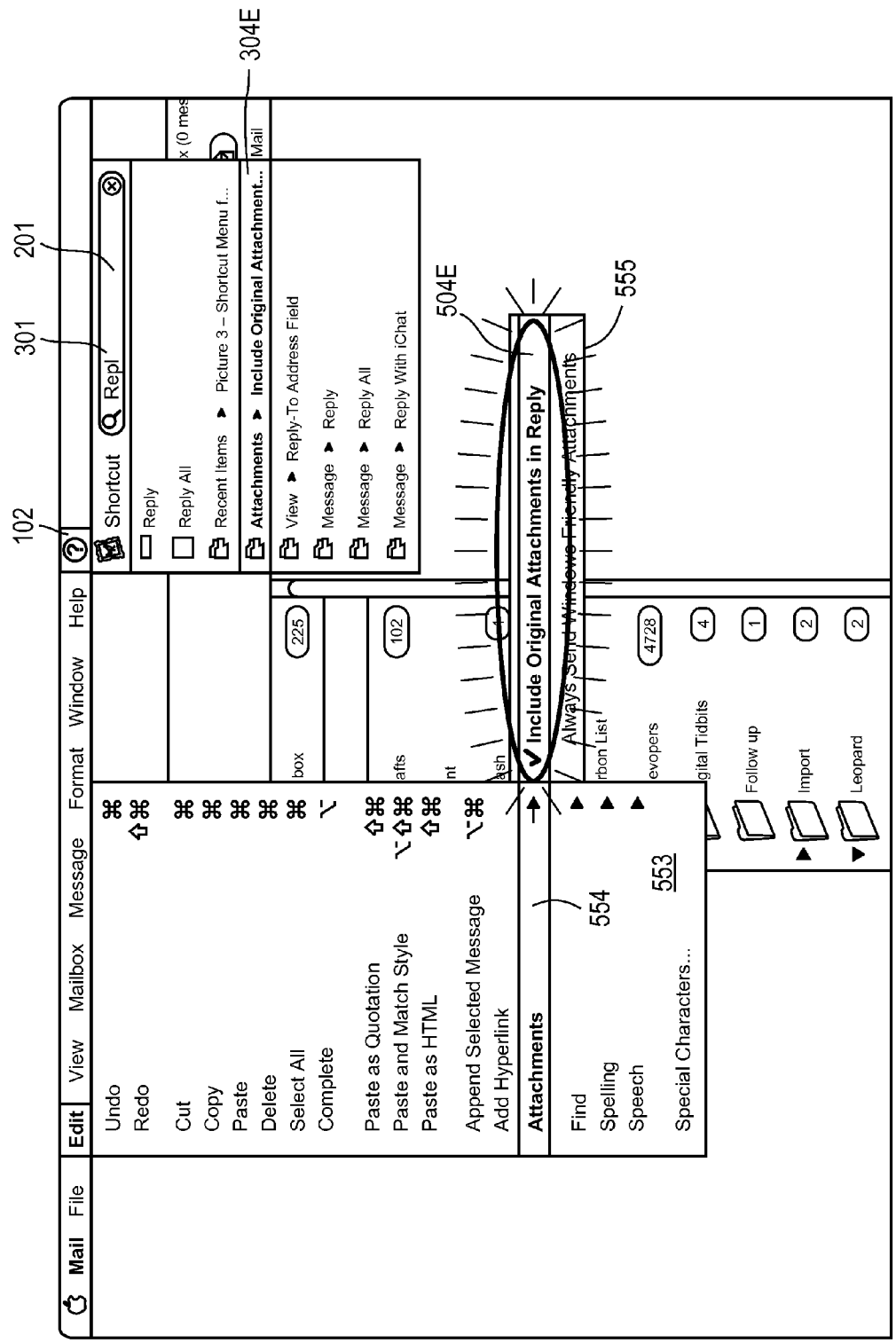
FIG. 5C is an additional screen shots depicting a technique for highlighting a menu command corresponding to a selected result in the results list according to one embodiment of the present invention.

Similarly, FIG. 5C shows another example where the selected search result 304E in menu 302 corresponds to a menu command 504E in menu 555, which is a submenu of menu 553. Here, both menus 553, 555 are brought into view to show the user the path to command 504E. Command 554 that is used to activate the submenu 555 is highlighted using standard inverse-video highlighting techniques.

The user can navigate within menu 302, for example by clicking up/down arrows on a keyboard, or by moving an on-screen cursor so that it hovers over a result 304. In one embodiment, the currently selected result 304 in menu 302 is highlighted using standard inverse-video highlighting techniques. One skilled in the art will recognize that any other distinctive visual technique can be used to indicate a highlighted or selected result 304 in menu 302.

In one embodiment, as described above, a glowing or spotlight (or other type of highlight) is applied to headings 101 for menus containing matching commands 504. Hovering over one of the highlighted menu headings 101 causes the corresponding menu to be brought into view, with matching command(s) 504 within that menu highlighted using the spotlight effect. In another embodiment, such a display takes place in response to the user activating the menu by clicking on heading 101.

The present invention provides a mechanism for allowing a user to quickly locate a menu command or other user interface element he or she is interested in. In addition, the invention serves to train the user as to which menus, dialog boxes, or windows contain which commands. By highlighting various commands and user interface elements as the user enters query text, and by providing additional distinctive highlighting in response to navigation within the menu containing search results, the present invention provides the user with a quick mechanism for learning how to find commands and other user interface elements.

In one embodiment, the present invention also provides quick access to help functionality. For example, next to each search result 304 an icon can be displayed; clicking on the icon causes help text to appear that is relevant to the command identified by the search result 304. Alternatively, the user can enter a keystroke or key combination while a search result 304 is highlighted to cause help text to be displayed for the command identified by the highlighted search result 304.

Figure 7:
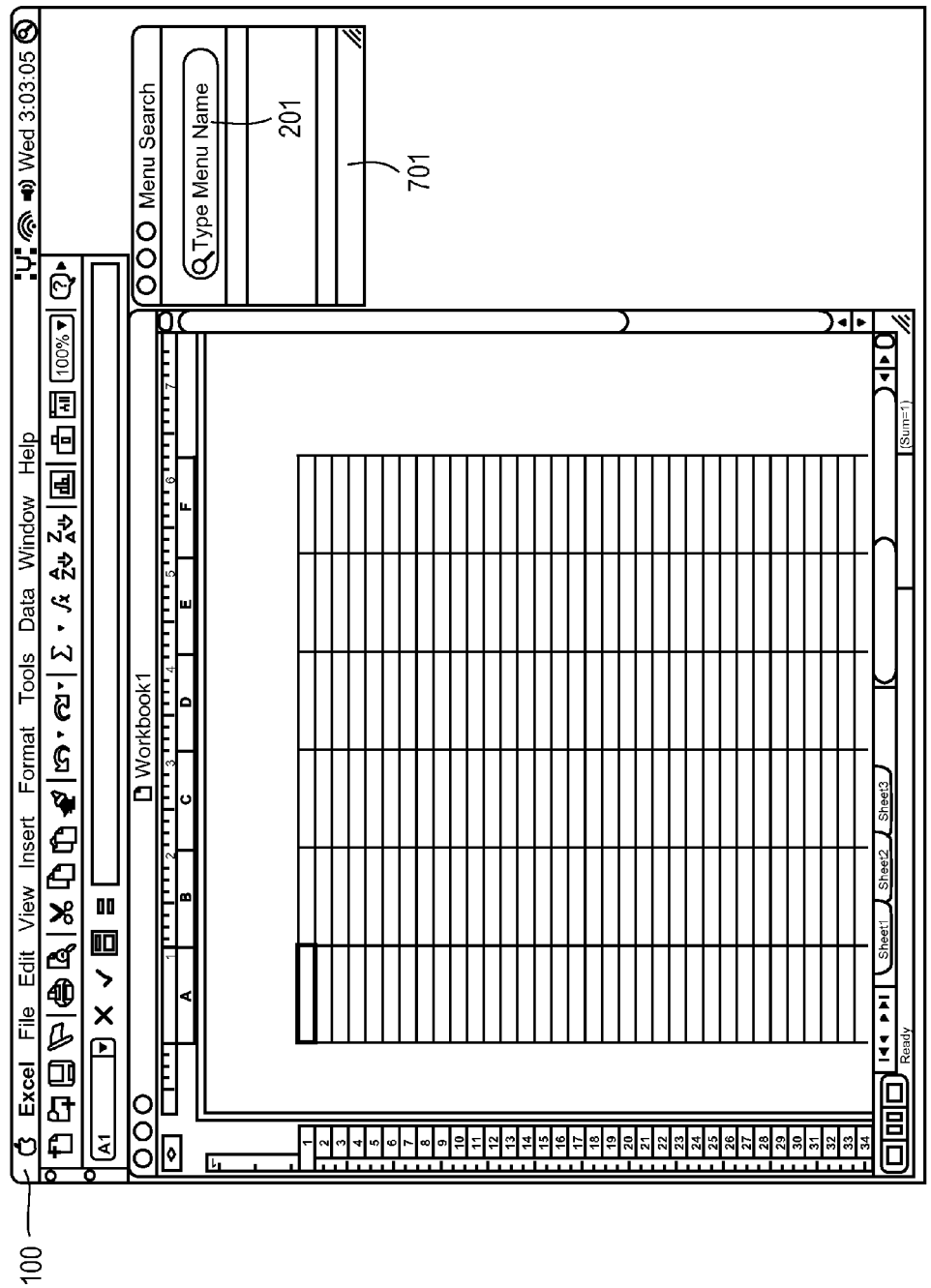
FIG. 7 is a screen shot depicting an example of a search box for initiating a search function according to one embodiment of the present invention.
Figure 8:
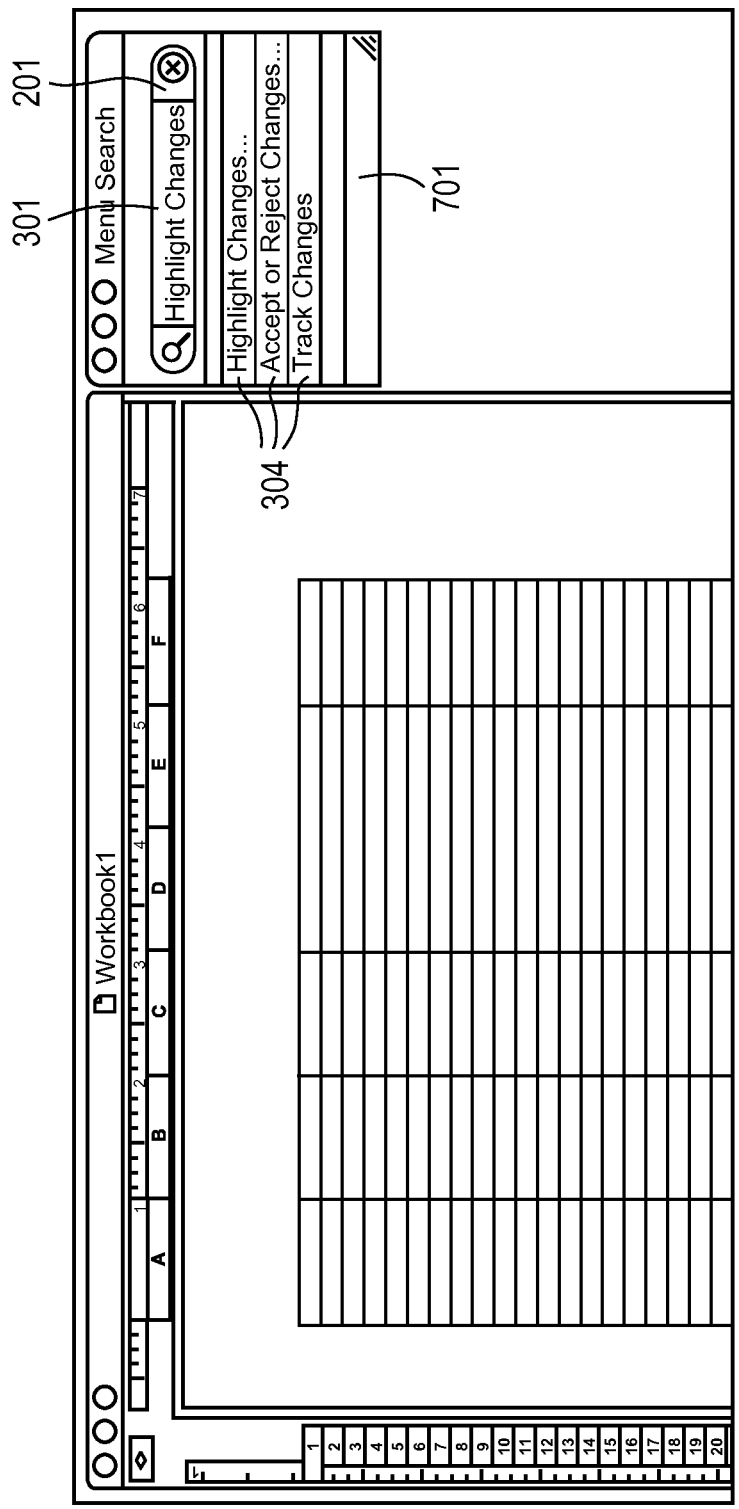
FIG. 8 is a screen shot depicting an example of a search box including a results list for a search query according to one embodiment of the present invention.
Figure 9:
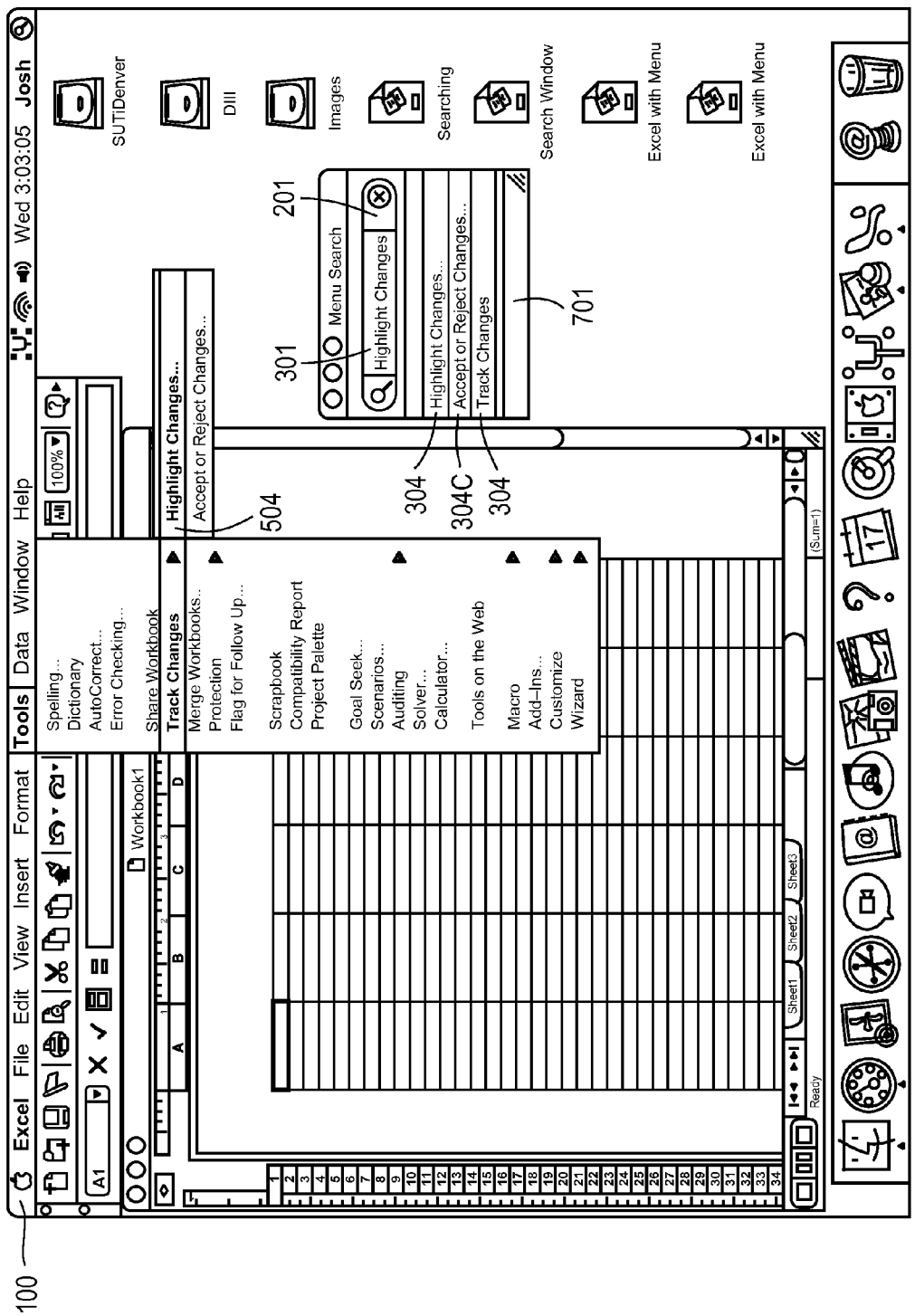
FIG. 9 is a screen shot depicting a technique for highlighting a menu command corresponding to a selected result in the results list according to one embodiment of the present invention.

Referring now to FIG. 7, there is shown an alternative embodiment where text field 201 is presented within menu search window 701 that is not connected to the menu bar 100. Window 701 may be moved around the screen, resized, maximized, minimized, and/or dismissed according to the user's wishes. In one embodiment, the user may drag menu 302 (shown in FIG. 3) off of menu bar 100 to automatically convert menu 302 into menu search window 701, and may drag menu search window 701 back onto menu bar 100 to convert it back to menu 302. Referring now to FIG. 8, there is shown an example of menu search window 701 including query text 301 and results 304. In one embodiment, the user interacts with results 304 the same way, regardless of whether they are presented in menu search window 701 or in menu 302. FIG. 9 depicts an example of a command 504 being automatically brought into view in response to the user having selected a result 304C in menu search window 701.

The present invention provides functionality for locating user interface elements that are currently visible on the screen, as well as user interface elements that are not currently visible on the screen. For example, the user can enter a search query for a command within a print dialog box; the results including the command will be shown whether or not the print dialog box is currently on the screen.

Functional Architecture

Referring now to FIG. 6, there is shown a block diagram depicting a functional architecture for implementing the invention according to one embodiment. As described above, the various components of FIG. 6 may be implemented in software. System 600 includes various menus 500 (and/or other user interface elements). Each menu 500 includes any number of commands 504. Search table 601 maintains search terms and their relationships to menus 500 and commands 504; as described above, search table 601 may include names for commands 504 as well as alternative and/or descriptive text. Search table 601 may be automatically constructed and updated from menus 500 and commands 504, or it can be manually constructed and updated. User interface 602 accepts input from input device 605 and outputs results via display 603. User interface 602 includes search field 201 for accepting user entry of query text 301, as described above. User interface 602 also includes menu 302 that presents search results 304 as described above. Query engine 604 is a software component that takes query text input 301 from search field 201, compares it with entries in search table 601, and generates search results 304 to be displayed in menu 302. Menu 302 is a component of user interface 602 that is output via display device 603. When menus 500 and/or commands 504 are to be displayed, user interface 602 handles the display and interaction with these elements as well.

As will be apparent to one skilled in the art, the invention is not limited to the particular application set forth in the above description, which is intended to be exemplary. For example, the invention can be used for searching for commands within windows, dialog boxes, folders, subfolders, taskbars, toolbars, or any other user interface element. The invention can be used for searching for user interface elements other than commands. The invention can also be used for searching for commands that are represented as icons or other non-textual elements.

Software Implementation

In the following description of a software implementation, the term "GRL" (Graphic Resource Locator) is used. A GRL is a persistent representation of how to reach a particular UI Element within the UI, containing enough information to display the item and/or make it perform its action. In one embodiment a GRL is a pair (path, data). The GRL path is a description on how to get to a UI element, and data can be any kind of information about the element (such as the title of the element, bounding box, description, or the like).

A GRL stores attributes that can be later used for searching. A UI item reachable if it can be made visible by sending a sequence of events to the application. Some reachable UI items are reachable only with user entering or selecting user-specific data. In one embodiment, the system of the present invention is able to display UI items that are reachable without the need for user-specific data.

An example of a text-based representation of a GRL is: path=<menu: "TextEdit"><window: "Preferences . . . "><tab: "New Document"><view: 3><GUI state: "Plain Text">data="Plain Text"

Figure 10:
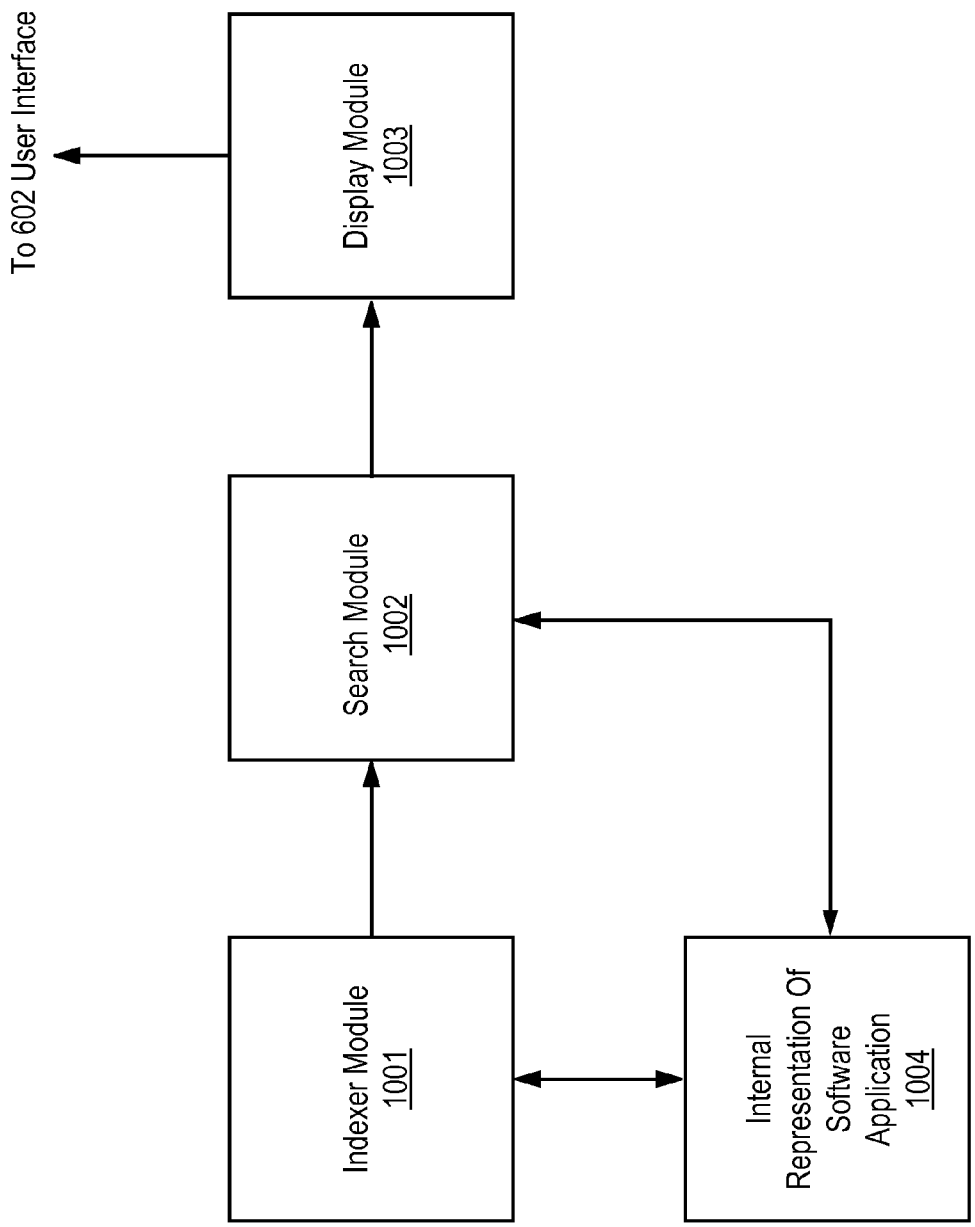
FIG. 10 is a block diagram depicting a software architecture for implementing the invention according to one embodiment.

Referring now to FIG. 10, there is shown a block diagram depicting a software architecture for implementing the invention according to one embodiment.

In one embodiment, the present invention is implemented as a stand-alone application. In other embodiments, it can be implemented as an embedded feature of a software application or operating system, or as a plug-in or widget In one embodiment, the invention is implemented using three functional software modules: indexer module 1001, search module 1002, and display module 1003.

Indexer module 1001 is responsible for computing an internal representation 1004 of an application for search purposes. In one embodiment, internal representation 1004 is a tree architecture. The root of the tree represents the application (it is actually wrapper for the AXUIElementRef of the current application processor identifier (PID). Each node in the tree describes a user interface element. Each node contains the following information:

a) information about the UI element, including its role, title, local graphical position within a parent window, and in general any attributes that are relevant to the search functionality;

b) pointers to maintain the tree representation; and c) the element icon which is used when the element string is displayed in menu 302.

Search module 1002 is responsible for retrieving elements in the application that match query text 301. It checks whether query text 301 matches any nodes in the tree or other internal representation 1004. The elements that match are added to results menu 302. Search module 1002 is also responsible for ranking results 304 according to a given heuristics (e.g. most recently used, most used, extent of the match, or the like). Search module 1002 is also responsible for building results menu 302. Results menu 302 is empty when text field 201 contains no query text 301.

Display module 1003 is responsible for displaying the text search field 201 and for implementing the animation of the highlighted commands 504 and other user interface elements. In one embodiment, text search field 201 is implemented as a standalone window 701 as shown in FIG. 7; in another embodiment it is attached to menu bar 100 as shown in FIG. 2.

In one embodiment, display module 1003 includes animation code for displaying various commands 504 and user interface elements in response to user selection of results 304 within menu 302. Displaying a user interface element may involve bringing a window (or any other user interface element) into view, if it is hidden or inactive when the corresponding result 304 is selected in menu 302. In other cases, displaying a user interface element may involve opening a menu 554 and/or submenu 552, as depicted in FIG. 5.

In addition, display module 1003 includes animation code for implementing a spotlight effect to highlight the selected user interface element, as described above. In one embodiment, the graphic effects are achieved using the OpenGL API, available from Apple Computer, Inc. of Cupertino, Calif. In another embodiment, the graphic effects are achieved using CoreGraphics, a framework available from Apple Computer, Inc.

In one embodiment, display module 1003 sends display information to user interface 602 so that the appropriate display can be shown to the user.

In one embodiment, an additional module (not shown) is responsible for performing the action associated with a selected result 304 when the user hits the Enter or Return key.

In one embodiment, indexer module 1001 generates a dynamic index by storing the UI elements that become visible at run time (as a result of a user action). Dynamic indexing stores information about various UI elements as they become visible at run time. Whenever a new UI element becomes visible on the screen, a node is added to the tree that forms internal representation 1004. Nodes are not removed when a UI element is dismissed from the screen. In this fashion, the construction of internal representation 1004 of the UI elements takes place as a learning process over time; the result is a tree-based organizational scheme that can be used to quickly identify relationships among UI elements.

In one embodiment, in order to avoid presenting results 304 that are no longer valid based on the current state of the user interface, the UI element for each potential results 304 is validated before menu 302 is presented. Validation is performed by determining whether or not the UI element can be displayed given the current state of the application and/or operating system. In one embodiment, results 304 that correspond to currently disabled or unavailable commands or elements are shown in grayed-out fashion or using some other distinctive visual technique within menu 302; in another embodiment, they are shown at the bottom of the list of results; in another embodiment, they are not shown at all.

In one embodiment, the system of the present invention makes its internal representation 1004 available for use by other applications and/or by other instances of the system, for example in a publicly available location identified by a URL. In this manner, one user's system can take advantage of internal representation 1004 generated by another user's system, and can even update internal representation 1004 as appropriate. In some cases, various applications and/or user computers can share the same internal representation 1004.

In another embodiment, the system of the present invention uses static indexing. In static indexing, the UI structure of the application and/or operating system is scanned in advance using a software tool. The software tool activates every available UI element so that it can be added as a node in internal representation 1004. The system of the present invention can thereby generate internal representation 1004 without waiting for all of the various UI elements to be brought into view during the normal course. In one embodiment, internal representation 1004 can be shipped along with the software product, so that users of the software product can immediately take advantage of the features provided by the present invention. Internal representation 1004 can be updated as appropriate whenever a software application or operating system is updated or reconfigured. A description of a software tool for scanning an application, referred to as an "App Analyzer", is provided below.

In one embodiment, an internal representation 1004 is generated and stored for each localized version of a software application or operating system. In another embodiment, internal representation 1004 is generated and stored for one canonical version of the software application, such as for example the U.S. version, and other versions are handled via on-the-fly scanning of localized strings that differ from the U.S. version. Thus, a hybrid approach can be realized wherein a static index is used for canonical versions and a dynamic index is used for other versions.

In one embodiment, the index is language-dependent. For a multi-lingual operating system environment, an index is computed and stored for each language. Depending on which language is used for the current instance of the application or operating system, the appropriate index is used.

In another embodiment, the user interface elements are not indexed. Rather, an application programming interface (API) is provided that allows applications to register their UI elements and structure with the system of the present invention.

In one embodiment, the present invention is implemented using a Model View Controller design pattern. Referring now to FIG. 17A, there is shown an overview 1700 of classes and relationships for implementing the present invention according to one embodiment.

SCTGRLIndex 1701 is the model for the hierarchical representation depicting relationships among user interface elements. It contains a collection of Graphical Resource Locators (GRLs).

NSArray 1705 contains the data according to the model.

SCTSearchManager 1702 is the primary controller according to one embodiment. It coordinates user interactions and queries on the model. It also handles wiring for various app level notifications.

NSView 1703 and NSTableView 1704 specify the appearance of the search and results interface. In one embodiment, NSView 1703 and NSTableView 1704 use AppKit view classes placed inside a Carbon Help Menu. SCTSearchManager 1702 is used as the data source and delegate as appropriate. A specialized class SCTAnimationController 1706 handles the openGL animation to showcase the UI element to the user, for example by dimming the screen and drawing a spotlight around the displayed UI element. In the context of this description, "showcase" means to display a UI element.

Referring now to FIG. 17B, there is shown an event trace 1710 depicting the flow of control that takes place when a user enters text in field 201.

The user enters 1713 query 301 in field 201. SCTSearchManager 1702 is activated as a result of text being changed 1714 in field 201. SCTSearchManager 1702 initiates search 1716 on index 1701, generating search results 1711. NSTableView 1704 is informed that an update to its display is needed via reloadData message 1717.

The user selects 1718 one of the displayed results 304. SCTSearchManager 1702 is informed that the selection changed via selectionChanged message 1719. SCTSearchManager 1702 causes the appropriate UI element to be displayed by sending a showcase message 1720 to SCTAnimationController 1706 that references the appropriate GRL 1712.

In one embodiment, Graphical Resource Locators (GRLs) are represented according to a hierarchy. Referring now to FIG. 17C, there is shown a class hierarchy 1730 for GRLs, starting with class SCTGRL 1731.

In the example shown in FIG. 17C, GRLs are subclassed to represent particular kinds of UI elements such as Views, Windows, Menu Items, Accessibility Attributes, and the like. Classification can also take place between directly reachable UI elements (those that are accessible programmatically when the application is launched and has a default document window open) and indirect UI elements (those that are only visible after performing one or more actions in the user interface). Examples of directly reachable UI elements include:

Menu Items reachable via the Menu Bar.
Buttons/Checkboxes/Text fields/etc. on the main window.

An examples of indirect UI elements might be a check box buried inside a preferences window; the preferences menu would have to be invoked in order to show the preferences window and thereby display the check box.

Classification can also take place between statically reachable UI elements (those that are always reachable) and data-dependent UI elements (those that are reachable only when the application is in specific states, and/or require the entry of specific data). Examples of statically reachable UI elements include:

Items in the File Menu.
Controls in the preferences panel.
Examples of data-dependent UI elements include:
Table inspector (visible only after inserting a table into text).
Login Options tab (visible only after clicking on a lock icon in an Accounts pane of system preferences and entering a password).

In one embodiment, data-dependent UI elements are not indexed or searched on by the system of the present invention.

Members of the SCTMenuItemGRL class 1732 include paths of strings that identify the path to the menu item of interest.

Members of the SCTWindowGRL class 1733 include a key to recognize the type of window it is (usually the title+the class) and a trigger GRL. The trigger GRL is the action that causes the window to appear.

Members of the SCTViewGRL class 1734 are views that are contained within windows or other containers. They contain the GRL for their container and a path of subview indices that locate the specific view. View GRLs are subclassed for various specialized types such as Buttons (SCTButtonGRL class 1735) and TextFields (SCTTextFieldGRL class 1736).

Members of the SCTHelpItemGRL class (not shown) contain a Uniform Resource Locator (URL) that points into a help system.

Members of the SCTApplicationGRL class 1737 point to another application. This may be used, for example, to locate other indices that may be linked to the application.

Members of the SCTAccessibilityGRL class 1738 provide access to the accessibility hierarchy.

Referring now to FIG. 17D, there is shown a SCTInvocation class 1741 and a SCTGRLResolver class 1742. In some cases, an indirect UI element can be displayed only by triggering a series of events in order. For example suppose a GRL is provided for a "Show Ruler" checkbox in a preferences panel. If the preferences panel is not visible it must first be displayed before the checkbox can be showcased. The SCTInvocation class 1741 and a SCTGRLResolver class 1742 accomplish this task.

The SCTInvocation class 1741 is a wrapper to store a target and a selector. When a client calls on it, it can invoke the selector on the target passing in the argument passed into perform. It is able to do this either directly or it can be wired as the target of a notification in which case it passes in the notification object as the argument to perform.

The SCTGRLResolver class 1742 is a subclass of the SCTInvocation class 1741 that contains a reference to a GRL. It functions the same way as an Invocation except that whatever is passed into the perform method is resolved (changed) by the GRL. For example, a window GRL will resolve a window to its content view. A view GRL will resolve a root view in a view hierarchy to the specific sub-view (such as the OK button in a dialog box) that the GRL refers to.

Referring now to FIG. 17E, there is shown an example of the process 1751 of resolving a window to its content view based on a windowDidBecomeVisible notification. The notification passes in a window which is passed to resolveResource on the GRL. This returns the contentView, which is in turn passed to a call of myMethod on myTarget.

Figure 17F:
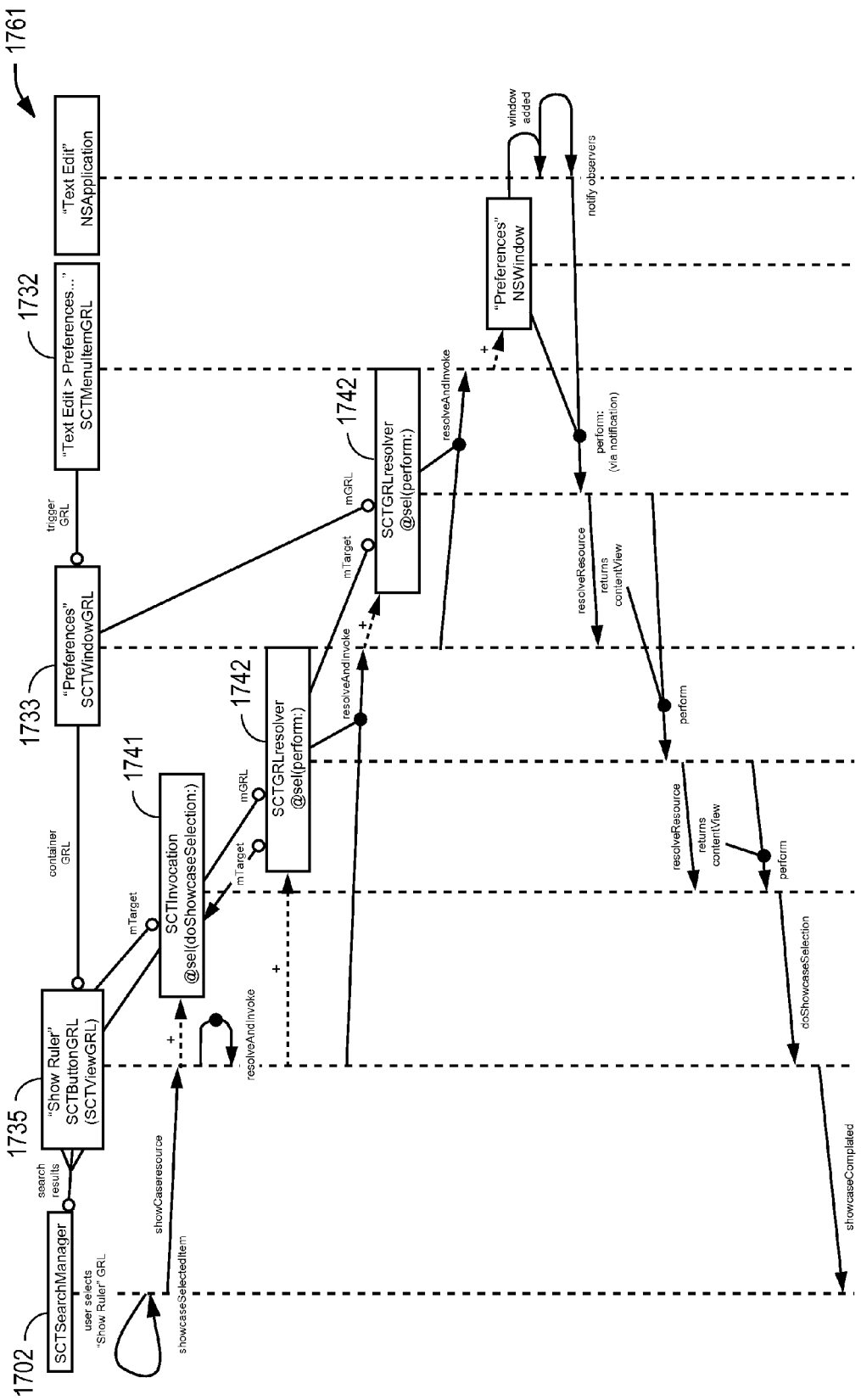
FIG. 17F depicts an example where a "Show Ruler" checkbox is displayed in response to user selection of a "Show Ruler" result.

FIG. 17F shows another example 1761 where a "Show Ruler" checkbox is displayed in response to user selection of a "Show Ruler" result.

App Analyzer

In one embodiment, the system of the present invention searches the application for all reachable UI Items to build an index. A software tool known as App Analyzer scans the UI structure of an application and/or operating system in advance so that it can be indexed appropriately. App Analyzer operates in a controlled environment to walk through the application and/or operating system and expose UI elements therein.

App Analyzer creates a collection of GRLs that represent UI elements in an application. This collection forms the index that will be searched when a query is entered. The App Analyzer tool starts by enumerating all the visible GUI elements as GRLs. For example, when the App Analyzer analyzes an application, the initial collection contains the menu items in the menu bar and the document window for the application.

Then, the tool executes the action for each GRL in the current collection, and it observes any changes that happen as a result. Examples include: a new window shows up, a window is resized, or a window title changes. In other words, the tool uses a heuristic to determine that new UI elements have been revealed.

The GRLs for the new GUI elements (subindex) are added to the collection and the process continues until all GRLs are explored and no new UI elements are found.

The index generated by the App Analyzer is then read back into memory when needed, and is used by the system of the present invention to search for UI elements to be showcased.

The above description is set forth in the context of a mechanism for locating user interface elements for a software application. However, one skilled in the art will recognize that the invention can also be implemented as a mechanism for locating user interface elements for an operating system, web-based application, applet, desk accessory, widget, gadget, consumer electronic device, or the like. The invention can also be implemented across more than one such entity; for example, a search query can yield results for an operating system as well as for all installed applications.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. It will be recognized that the invention may be implemented any type of electronic device, such as handhelds, personal digital assistants (PDAs), mobile telephones, consumer electronics devices, embedded devices, and the like.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-implemented method for searching for menu commands of an application of a computer, the method comprising:
   receiving a user input representing a search query;
   displaying by the computer a list of search results that corresponds to menu commands of the application that are related to the search query;
   receiving a user selection of a search result within the list; and
   responsive to the user selection, graphically illustrating a location of a menu command corresponding to the selected search result in a menu of the application.

2. The computer-implemented method of claim 1, further comprising:
   receiving a second user selection of a second search result within the list;
   responsive to the second user selection, dismissing the display of the location of the menu command; and
   graphically illustrating a location of a second menu command corresponding to the second search result in one of a plurality of menus of the application.

3. The computer-implemented method of claim 1, wherein the list of search results further comprises search results corresponding to menu items of an operating system of the computer.

4. The computer-implemented method of claim 1, further comprising:
   displaying, concurrently with the display of the list of search results, a representation of at least one additional item having text matching the search query, wherein the at least one additional item comprises at least one selected from the group consisting of:
a document;
a message; and
a folder.

5. The computer-implemented method of claim 1, wherein the user input comprises keystrokes representing a text string.

6. The computer-implemented method of claim 1, wherein displaying the list of search results is performed responsive to receiving an indication that the user has finished entering the search query.

7. The computer-implemented method of claim 6, wherein the indication comprises user activation of an Enter key.

8. The computer-implemented method of claim 6, wherein the indication comprises a pause in user entry of the search query, the pause exceeding a predetermined length.

9. The computer-implemented method of claim 1, wherein displaying the list of search results is performed responsive to user entry of a character for the search query.

10. The computer-implemented method of claim 1, wherein displaying the list of search results comprises displaying a menu comprising the list of search results, the menu included in a menu bar of the application.

11. The computer-implemented method of claim 1, wherein graphically illustrating the location of the menu command corresponding to the search result comprises applying a glow effect to a menu heading of the menu that comprises the menu command corresponding to the search result.

12. The computer-implemented method of claim 1, wherein graphically illustrating the location of the menu command corresponding to the search result comprises applying a spotlight effect to a menu heading of the menu that comprises the menu command corresponding to the search result.

13. The computer-implemented method of claim 12, wherein applying the spotlight effect comprises performing at least one of:
lightening a first screen area surrounding the menu command corresponding to the search result; and
darkening a second screen area surrounding the first screen area so that the second screen area is darker than the first screen area.

14. The computer-implemented method of claim 13, wherein the difference in brightness between the first screen area and the second screen area is gradated.

15. The computer-implemented method of claim 1, further comprising:
displaying, adjacent to at least one search result in the list, a user-activatable help link associated with the search result.

16. The computer-implemented method of claim 15, further comprising:
responsive to receiving user activation of the help link, displaying descriptive information for the menu command corresponding to the search result.

17. The computer-implemented method of claim 1, wherein at least on search result in the list partially matches the search query.

18. The computer-implemented method of claim 1, wherein graphically illustrating the location of the menu command comprises highlighting the menu command corresponding to the search result thereby changing a visual feature of the menu command corresponding to the search result.

19. The computer-implemented method of claim 18, wherein highlighting the menu command comprises displaying an arrow that points to a location of the menu command corresponding to the search result in one of a plurality of menus in a menu bar of the application.

20. The computer-implemented method of claim 1, wherein graphically illustrating the location of the menu command comprises displaying the menu command corresponding to the search result in a sub-menu of the menu of the application.

21. The computer-implemented method of claim 1, wherein receiving the user selection of the search result comprises receiving a user input clicking on the search results.

22. The computer-implemented method of claim 1, wherein receiving the user selection of the search result comprises receiving a user input hovering a cursor over the search result.

23. The computer-implemented method of claim 1, further comprising:
responsive to receiving the user selection of the search result, activating the menu command associated with the search result.

24. The computer-implemented method of claim 23, further comprising:
dismissing the list of search results.

25. A computer program product for searching for menu commands of an application of a computer, the computer program product comprising a non-transitory computer-readable storage medium storing executable code for:
receiving a user input representing a search query;
displaying a list of search results that corresponds to menu commands of the application that are related to the search query;
receiving a user selection of a search result within the list; and
responsive to the user selection, graphically illustrating a location of a menu command corresponding to the selected search result in a menu of the application.

26. The computer-program product of claim 25, wherein the code is further for:
receiving a second user selection of a second search result within the list;
responsive to the second user selection, dismissing the display of the location of the menu command; and
graphically illustrating a location of a second menu command corresponding to the second search result in one of a plurality of menus of the application.

27. The computer program product of claim 25, wherein displaying the list of search results comprises displaying a menu comprising the list of search results, the menu included in a menu bar of the application.

28. The computer program product of claim 25, wherein graphically illustrating the location of the menu command corresponding to the search result comprises applying a spotlight effect to a menu heading of the menu that comprises the menu command corresponding to the search result.

29. The computer program product of claim 25, wherein graphically illustrating the location of the menu command comprises highlighting the menu command corresponding to the search result thereby changing a visual feature of the menu command corresponding to the search result.

30. The computer program product of claim 28, wherein highlighting the menu command comprises displaying an arrow that points to a location of the menu command corresponding to the search result in one of a plurality of menus in a menu bar of the application.

31. A computer system for searching for menu commands of an application of the computer system, the computer system comprising:

a computer processor; and a computer-readable storage medium storing executable code when executed by the processor cause the processor to:

receive a user input representing a search query;

display a list of search results that corresponds to menu commands of the application that are related to the search query;

receive a user selection of a search result within the list; and responsive to the user selection, graphically illustrate a location of a menu command corresponding to the selected search result in a menu of the application.

32. The computer system of claim 31, wherein graphically illustrating the location of the menu command comprises displaying the menu command corresponding to the search result in a sub-menu of the menu of the application.

33. The computer system of claim 31, wherein receiving the user selection of the search result comprises receiving a user input hovering a cursor over the search result.

34. The computer system of claim 31, wherein the code when executed by the processor further causes the processor to:

responsive to receiving the user selection of the search result, activate the menu command associated with the search result.

35. The computer system of claim 34, wherein the code when executed by the processor further causes the processor to:

dismiss the list of search results.

* * * * *

UNITED STATES PATENT AND TRADEMARK OFFICE
CERTIFICATE OF CORRECTION

PATENT NO.        : 8,607,162 B2
APPLICATION NO.   : 13/154352
DATED             : December 10, 2013
INVENTOR(S)       : Williams et al.

Page 1 of 6

It is certified that error appears in the above-identified patent and that said Letters Patent is hereby corrected as shown below:

On the Title Page, References Cited

On page 2, in column 2, under "Other Publications", line 1, delete ""Microsoft Active Accessibility"" and insert --"Microsoft Active Accessibility"--, therefor On page 2, in column 2, under "Other Publications", line 15, before "U.S.", insert --"--, therefor On page 2, in column 2, under "Other Publications", line 15, after "2008", insert --"--, therefor On page 2, in column 2, under "Other Publications", line 17, before "U.S.", insert --"--, therefor On page 2, in column 2, under "Other Publications", line 17, after "2009", insert --"--, therefor On page 2, in column 2, under "Other Publications", line 18, before "U.S.", insert --"--, therefor On page 2, in column 2, under "Other Publications", line 18, after "2012", insert --"--, therefor On page 2, in column 2, under "Other Publications", line 20, before "U.S.", insert --"--, therefor On page 2, in column 2, under "Other Publications", line 21, after "2009", insert --"--, therefor On page 2, in column 2, under "Other Publications", line 22, before "U.S.", insert --"--, therefor On page 2, in column 2, under "Other Publications", line 23, after "2009", insert --"--, therefor On page 2, in column 2, under "Other Publications", line 24, before "U.S.", insert --"--, therefor On page 2, in column 2, under "Other Publications", line 25, after "2012", insert --"--, therefor On page 2, in column 2, under "Other Publications", line 26, before "U.S.", insert --"--, therefor On page 2, in column 2, under "Other Publications", line 26, after "2008", insert --"--, therefor Signed and Sealed this
Twenty-ninth Day of July, 2014

Michelle K. Lee
*Deputy Director of the United States Patent and Trademark Office*

On page 2, in column 2, under "Other Publications", line 28, before "U.S.", insert --"--, therefor On page 2, in column 2, under "Other Publications", line 29, after "2008", insert --"--, therefor On page 2, in column 2, under "Other Publications", line 30, before "U.S.", insert --"--, therefor On page 2, in column 2, under "Other Publications", line 31, after "2013", insert --"--, therefor On page 2, in column 2, under "Other Publications", line 32, before "U.S.", insert --"--, therefor On page 2, in column 2, under "Other Publications", line 33, after "2007", insert --"--, therefor On page 2, in column 2, under "Other Publications", line 34, before "U.S.", insert --"--, therefor On page 2, in column 2, under "Other Publications", line 35, after "2012", insert --"--, therefor On page 2, in column 2, under "Other Publications", line 36, before "U.S.", insert --"--, therefor On page 2, in column 2, under "Other Publications", line 37, after "2009", insert --"--, therefor On page 2, in column 2, under "Other Publications", line 38, before "U.S.", insert --"--, therefor On page 2, in column 2, under "Other Publications", line 39, after "2008", insert --"--, therefor On page 2, in column 2, under "Other Publications", line 40, before "U.S.", insert --"--, therefor On page 2, in column 2, under "Other Publications", line 41, after "2005", insert --"--, therefor On page 2, in column 2, under "Other Publications", line 42, before "U.S.", insert --"--, therefor On page 2, in column 2, under "Other Publications", line 42, after "2009", insert --"--, therefor On page 2, in column 2, under "Other Publications", line 43, before "U.S.", insert --"--, therefor On page 2, in column 2, under "Other Publications", line 44, after "2009", insert --"--, therefor On page 2, in column 2, under "Other Publications", line 45, before "U.S.", insert --"--, therefor On page 2, in column 2, under "Other Publications", line 46, after "2008", insert --"--, therefor On page 2, in column 2, under "Other Publications", line 47, before "U.S.", insert --"--, therefor On page 2, in column 2, under "Other Publications", line 48, after "2008", insert --"--, therefor On page 2, in column 2, under "Other Publications", line 49, before "U.S.", insert --"--, therefor On page 2, in column 2, under "Other Publications", line 50, after "2008", insert --"--, therefor On page 2, in column 2, under "Other Publications", line 51, before "U.S.", insert --"--, therefor On page 2, in column 2, under "Other Publications", line 52, after "2007", insert --"--, therefor CERTIFICATE OF CORRECTION (continued)
U.S. Pat. No. 8,607,162 B2

On page 2, in column 2, under "Other Publications", line 53, before "U.S.", insert --"--, therefor On page 2, in column 2, under "Other Publications", line 54, after "2010", insert --"--, therefor On page 2, in column 2, under "Other Publications", line 55, before "U.S.", insert --"--, therefor On page 2, in column 2, under "Other Publications", line 56, after "2010", insert --"--, therefor On page 2, in column 2, under "Other Publications", line 57, before "U.S.", insert --"--, therefor On page 2, in column 2, under "Other Publications", line 57, delete "Ju." and insert --Jun.--, therefor On page 2, in column 2, under "Other Publications", line 58, after "2010", insert --"--, therefor On page 2, in column 2, under "Other Publications", line 59, before "U.S.", insert --"--, therefor On page 2, in column 2, under "Other Publications", line 60, after "2011", insert --"--, therefor On page 2, in column 2, under "Other Publications", line 61, before "U.S.", insert --"--, therefor On page 2, in column 2, under "Other Publications", line 62, after "2011", insert --"--, therefor On page 2, in column 2, under "Other Publications", line 63, before "U.S.", insert --"--, therefor On page 2, in column 2, under "Other Publications", line 64, after "2010", insert --"--, therefor On page 2, in column 2, under "Other Publications", line 65, before "U.S.", insert --"--, therefor On page 2, in column 2, under "Other Publications", line 66, after "2011", insert --"--, therefor On page 2, in column 2, under "Other Publications", line 67, before "U.S.", insert --"--, therefor On page 2, in column 2, under "Other Publications", line 68, after "2010", insert --"--, therefor On page 2, in column 2, under "Other Publications", line 69, before "U.S.", insert --"--, therefor On page 2, in column 2, under "Other Publications", line 70, after "2010", insert --"--, therefor On page 2, in column 2, under "Other Publications", line 71, before "Australian", insert --"--, therefor On page 2, in column 2, under "Other Publications", line 72, after "2010", insert --"--, therefor On page 2, in column 2, under "Other Publications", line 73, before "Australian", insert --"--, therefor On page 2, in column 2, under "Other Publications", line 74, after "2011", insert --"--, therefor On page 3, in column 1, under "Other Publications", line 1, before "Canadian", insert --"--, therefor On page 3, in column 1, under "Other Publications", line 2, after "2012", insert --"--, therefor On page 3, in column 1, under "Other Publications", line 3, before "Canadian", insert --"--, therefor On page 3, in column 1, under "Other Publications", line 4, after "2012", insert --"--, therefor On page 3, in column 1, under "Other Publications", line 5, before "Chinese", insert --"--, therefor On page 3, in column 1, under "Other Publications", line 6, after "2008", insert --"--, therefor On page 3, in column 1, under "Other Publications", line 7, before "Chinese", insert --"--, therefor On page 3, in column 1, under "Other Publications", line 8, after "2008", insert --"--, therefor On page 3, in column 1, under "Other Publications", line 10, before "Chinese", insert --"--, therefor On page 3, in column 1, under "Other Publications", line 11, after "2011", insert --"--, therefor On page 3, in column 1, under "Other Publications", line 13, before "Drag", insert --"--, therefor On page 3, in column 1, under "Other Publications", line 13, after "indicator", insert --"--, therefor On page 3, in column 1, under "Other Publications", line 15, before "European", insert --"--, therefor On page 3, in column 1, under "Other Publications", line 16, after "2012", insert --"--, therefor On page 3, in column 1, under "Other Publications", line 17, before "European", insert --"--, therefor On page 3, in column 1, under "Other Publications", line 18, after "2012", insert --"--, therefor On page 3, in column 1, under "Other Publications", line 19, before "European", insert --"--, therefor On page 3, in column 1, under "Other Publications", line 20, after "2007", insert --"--, therefor On page 3, in column 1, under "Other Publications", line 21, before "European", insert --"--, therefor On page 3, in column 1, under "Other Publications", line 22, after "2012", insert --"--, therefor On page 3, in column 1, under "Other Publications", line 23, before "European", insert --"--, therefor On page 3, in column 1, under "Other Publications", line 24, after "2007", insert --"--, therefor On page 3, in column 1, under "Other Publications", line 25, before "European", insert --"--, therefor On page 3, in column 1, under "Other Publications", line 26, after "2009", insert --"--, therefor On page 3, in column 1, under "Other Publications", line 28, before "European", insert --"--, therefor On page 3, in column 1, under "Other Publications", line 29, after "2009", insert --"--, therefor On page 3, in column 2, under "Other Publications", line 1, before "European", insert --"--, therefor On page 3, in column 2, under "Other Publications", line 2, after "2011", insert --"--, therefor On page 3, in column 2, under "Other Publications", line 3, before "International", insert --"--, therefor On page 3, in column 2, under "Other Publications", line 4, after "2007", insert --"--, therefor On page 3, in column 2, under "Other Publications", line 5, before "International", insert --"--, therefor On page 3, in column 2, under "Other Publications", line 6, after "2006", insert --"--, therefor On page 3, in column 2, under "Other Publications", line 7, before "International", insert --"--, therefor On page 3, in column 2, under "Other Publications", line 8, after "2006", insert --"--, therefor On page 3, in column 2, under "Other Publications", line 9, before "International", insert --"--, therefor On page 3, in column 2, under "Other Publications", line 10, after "2006", insert --"--, therefor On page 3, in column 2, under "Other Publications", line 11, before "Japanese", insert --"--, therefor On page 3, in column 2, under "Other Publications", line 12, after "2011", insert --"--, therefor On page 3, in column 2, under "Other Publications", line 13, before "Japanese", insert --"--, therefor On page 3, in column 2, under "Other Publications", line 14, after "2012", insert --"--, therefor On page 3, in column 2, under "Other Publications", line 15, before "Japanese", insert --"--, therefor On page 3, in column 2, under "Other Publications", line 16, after "2011", insert --"--, therefor On page 3, in column 2, under "Other Publications", line 18, before "Japanese", insert --"--, therefor On page 3, in column 2, under "Other Publications", line 19, after "2012", insert --"--, therefor On page 3, in column 2, under "Other Publications", line 21, before "Japanese", insert --"--, therefor On page 3, in column 2, under "Other Publications", line 22, after "2013", insert --"--, therefor On page 3, in column 2, under "Other Publications", line 26, after "H." insert --,--, therefor On page 3, in column 2, under "Other Publications", line 28, delete "A:," and insert --A.,--, therefor In the Claims In column 19, line 58, in Claim 17, delete "on" and insert --one--, therefor In column 20, line 23, in Claim 25, delete "computer program" and insert --computer-program--, therefor In column 20, line 45, in Claim 27, delete "computer program" and insert --computer-program--, therefor In column 20, line 49, in Claim 28, delete "computer program" and insert --computer-program--, therefor In column 20, line 54, in Claim 29, delete "computer program" and insert --computer-program--, therefor In column 20, line 59, in Claim 30, delete "computer program" and insert --computer-program--, therefor